Figure 15:
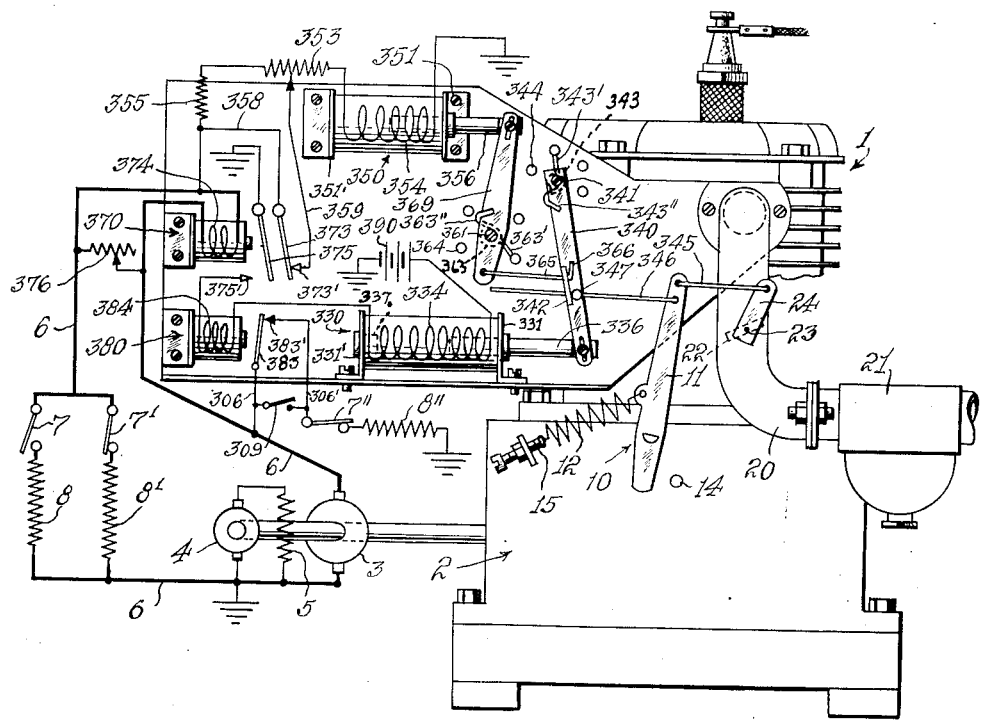

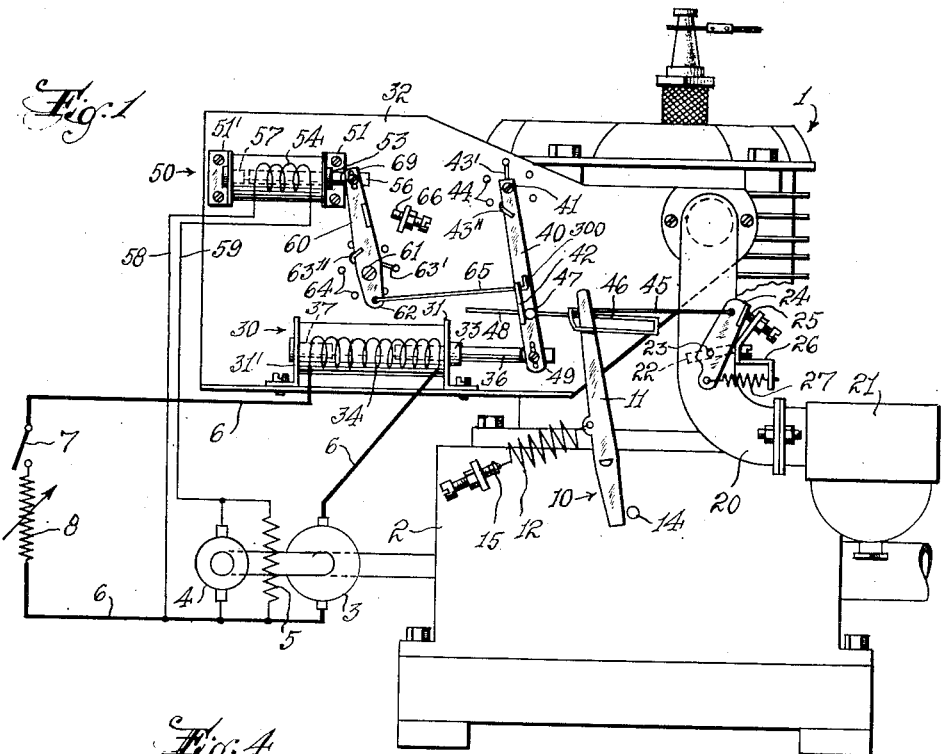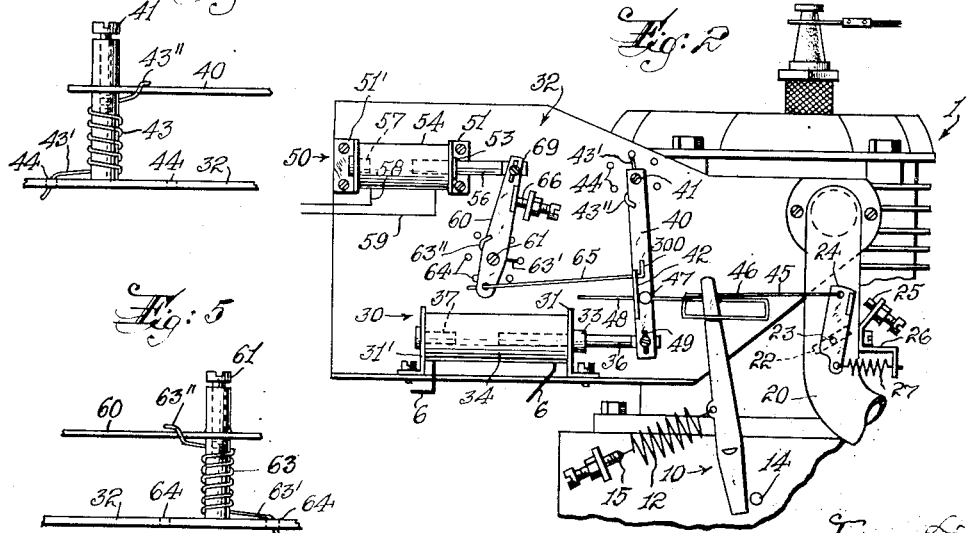

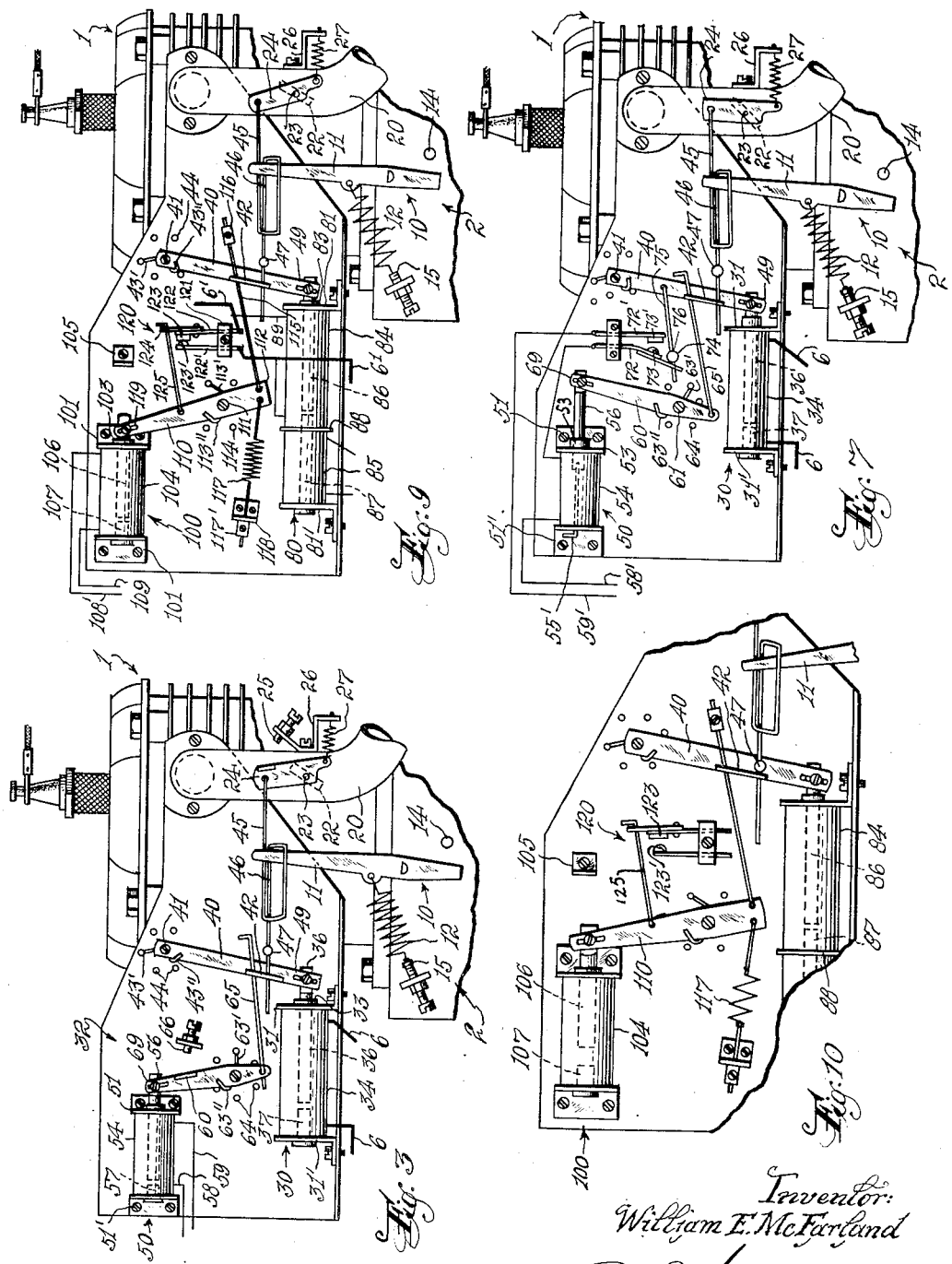

Oct. 8, 1957 W. E. McFARLAND 2,809,300
CONTROLLING LOWER FUEL-INTAKE ENGINE SPEED
Filed Feb. 25, 1955 7 Sheets-Sheet 3
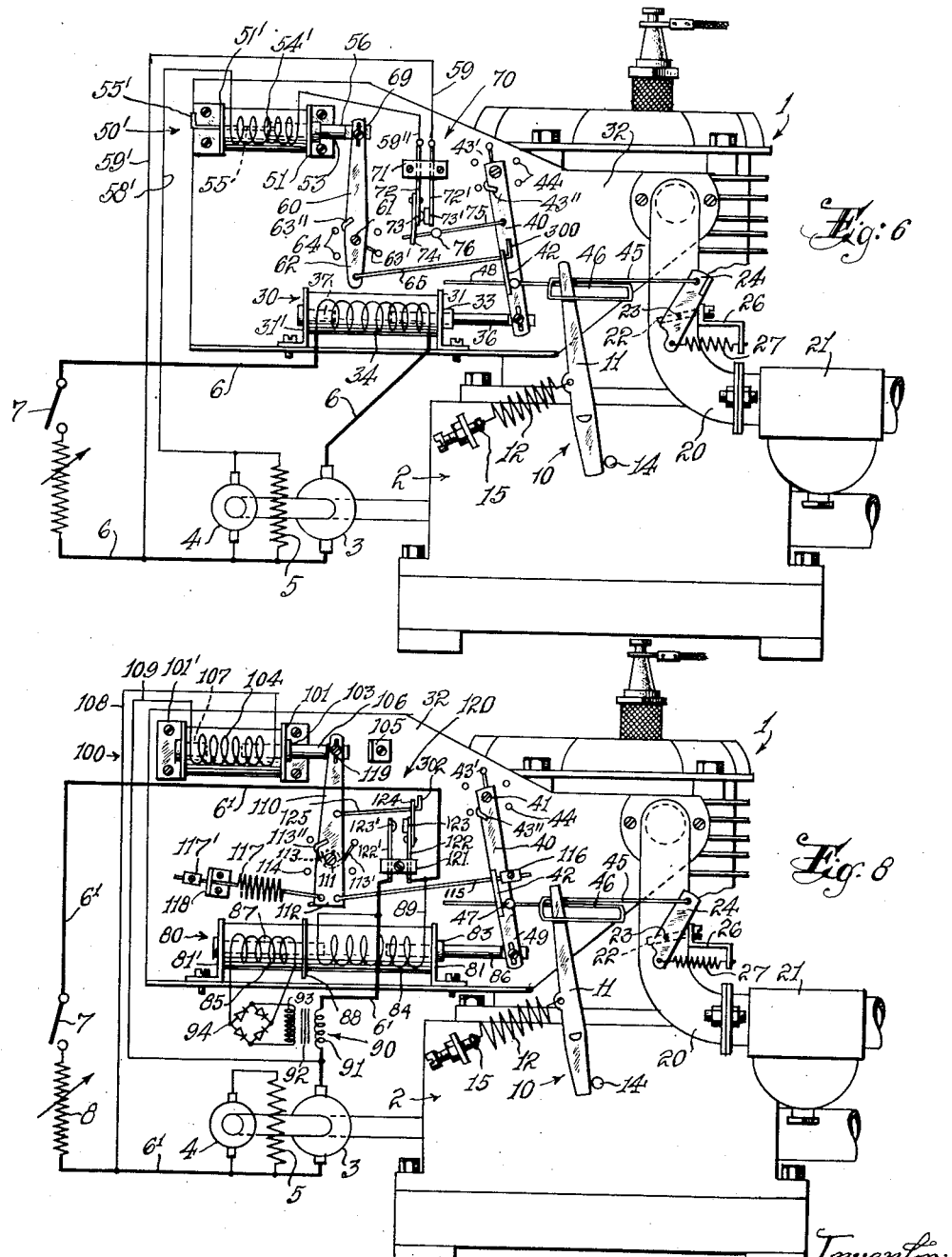

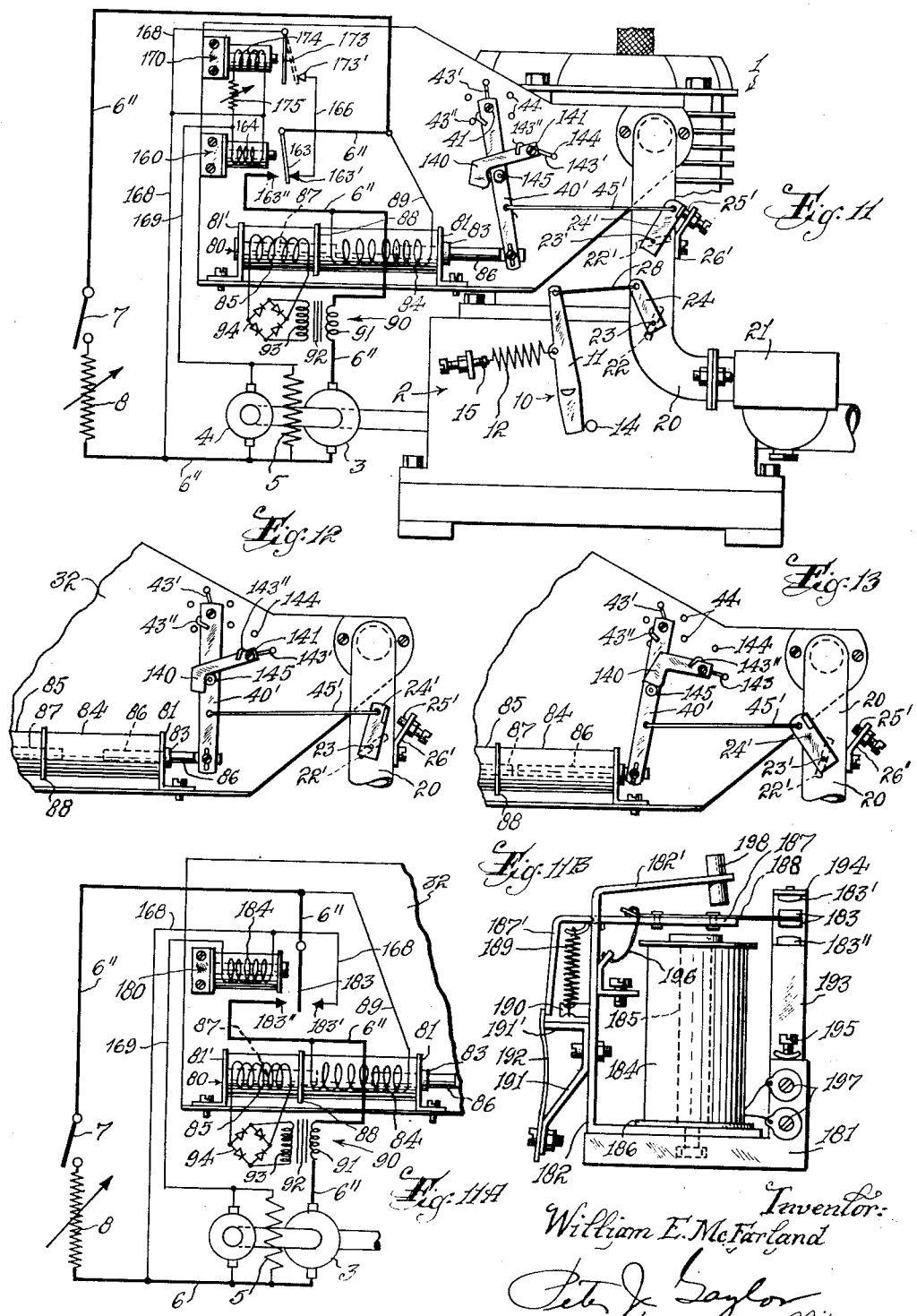

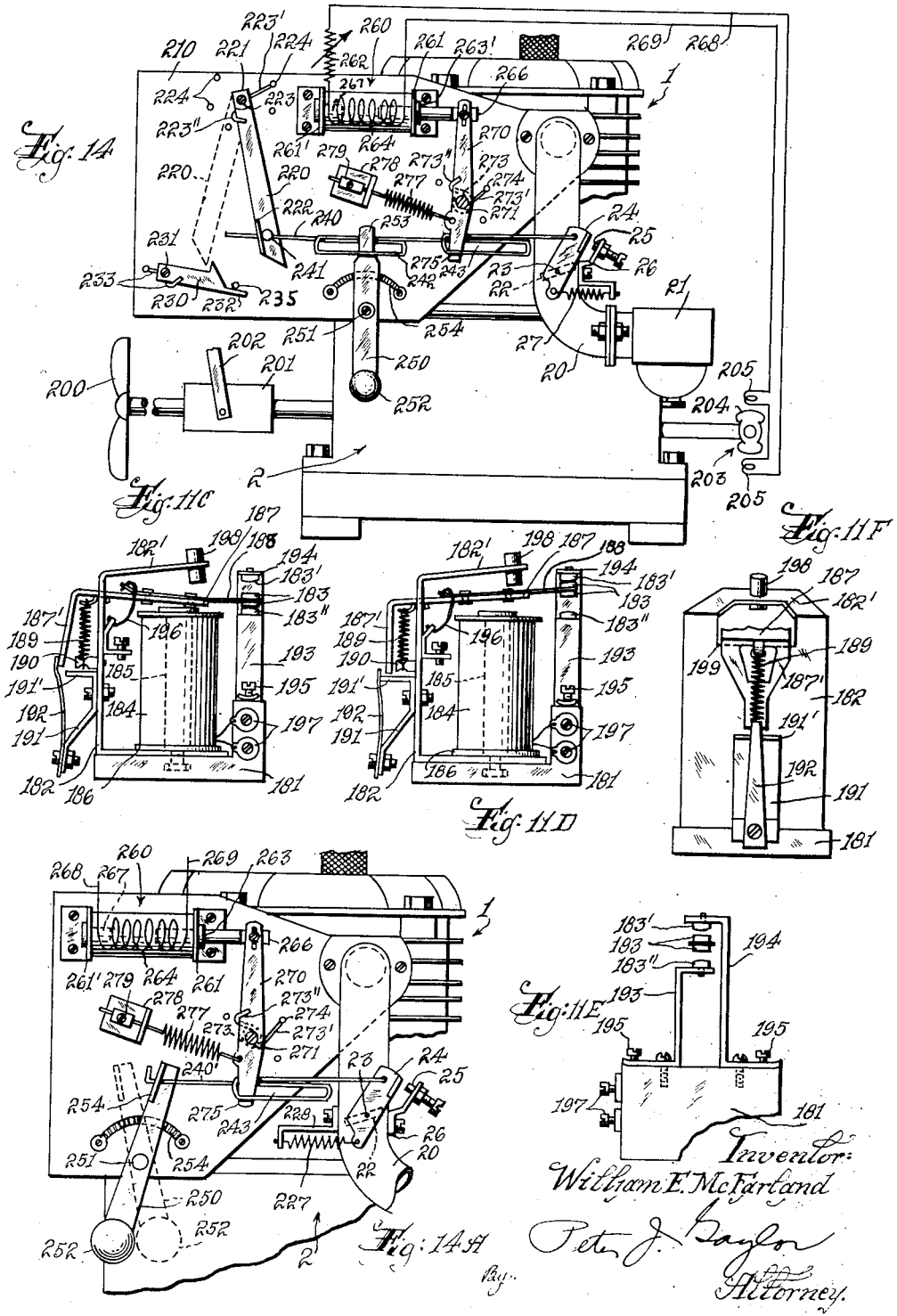

Oct. 8, 1957  W. E. McFARLAND  2,809,300
CONTROLLING LOWER FUEL-INTAKE ENGINE SPEED
Filed Feb. 25, 1955  7 Sheets-Sheet 6

Inventor:
William E. McFarland
By Peter J. Taylor
Attorney

United States Patent Office 2,809,300
Patented Oct. 8, 1957

2,809,300

CONTROLLING LOWER FUEL-INTAKE ENGINE SPEED

William E. McFarland, Nutley, N. J.

Application February 25, 1955, Serial No. 490,470

12 Claims. (Cl. 290—40)

This invention relates to the control of idling speed of internal combustion engines, particularly of those engines provided with manually or automatically-operated systems whereby the fuel supply to the engine is reduced to that required for idling speed upon termination of load, such engines also being provided with a load governor which is effective in maintaining engine speed within suitably close limits during the load period. The invention is especially directed to the control of engines driving an electric generator as the principal intermittent load, although it is not limited thereto and is applicable to specific application wherein the driven generator is a miniature one devised merely for providing sufficient current for powering the control system of the present invention. The invention is most useful when employed with engine-driven generating sets subjected to intermittent load and having automatic idling control means responsive to initiation and termination of load current flow whereby slow idling speed is enforced during off-load periods.

It is a general practice in the case of internal combustion engines, to employ an adjustable stop or limiting means in combination with the throttle valve or fuel metering system for enabling selection of a desired idling or off-load speed. It has been practically necessary to select an idling speed which is faster than that desired to insure against engine-stalling or loss (or breakdown) of generated voltage and to obtain smooth idling. In the case of generator sets provided with idling controls, the idling devices employed, instead of closing the throttle completely to the limit as determined by the adjustable throttle stop, may effect a speed-lowering adjustment of the load governor which remains in control of the throttle during the idling period. Such adjustment is made on the conventional centrifugal governor by applying a force which changes the spring biasing or loading of the governor or at least opposes and thus reduces the spring loading of the governor. Obviously, in the case of an adjusted governor, the adjustable throttle stop may, if desired, be adjusted so that it enforces a higher speed than that enforced by the adjusted governor, in which case the adjusted governor will advance the throttle only in the case of engine faltering or unevenness during warm-up. Alternately, the throttle adjustment screw may be so adjusted that it does not enforce a speed higher than the governed idling speed, but does prevent closure of the throttle to a point appreciably below that of the average throttle position required to sustain the governed idling speed so as to stabilize governing and reduce hunting tendencies.

Although an adjusted governor sometimes is suitable for establishing a controlled idling speed, such a governor really designed for load speed operation becomes unreliable and unresponsive in the case of slow idling speeds too far removed from the speed for which the centrifugal mechanism was designed. Besides, a significant degree of mechanical force is necessary for effecting a major adjustment in the biasing of the load governor, making it difficult for the idling device to be electromagnetically operated from generated current, as such an idling device would not develop a sufficiently powerful force to achieve the desired effect.

Another disadvantage in the use of an adjusted load governor for regulating idling speed is the fact that such a governor usually is sensitive only to loss of engine speed and is not usable for detecting a lack of generated voltage. Thus, in the case of automatically responsive idling controls, it is necessary to maintain sufficient voltage to properly energize the control elements so that load speed may be restored upon connection of a new load. The generated voltage may fail to build up after a momentary speed drop below the intended idling speed (as may occur due to a lag in the governor action, or if the engine is stopped and re-cranked), so that the engine may not respond to connection of load, making it necessary to advance the throttle manually to build up generated voltage.

A further disadvantage in the use of an adjusted governor, particularly with the use of idling control systems such as those described in copending application Serial No. 467,351, filed on November 8, 1954 by William E. McFarland, wherein the connection of the governor to the throttle is one whereby the load governor proper has no ability whatever to exert direct force toward opening of the throttle (which is accomplished by an auxiliary force) is that a load governor employing this type of throttle connection is incapable of being used on an adjusted basis for enforcing a predetermined minimum idling speed.

According to the present invention, a system is provided for governing the idling speed and voltage, or at least insuring that the idling speed and voltage are held at or above a predetermined minimum, thereby eliminating the disadvantages of other prior art systems. Specifically, the present invention embodies the following elements:

(1) A regulatable fuel intake system having at least one fuel flow control device, such as a throttle valve.

(2) A load governor system adapted to regulate the fuel intake system for operation during on-load condition.

(3) An idling system effective at termination of load and acting upon the intake system in a manner tending to shut off fuel supply, thereby enforcing an idling speed.

(4) An idle-speed governing or regulating means responsive to variations in generated voltage of a driven generator and adapted to variably limit the closing off of the fuel supply by the idling means, or at least adapted to enforce a temporary increase in fuel supply each time the idling voltage reaches a critical minimum.

Figure 16:
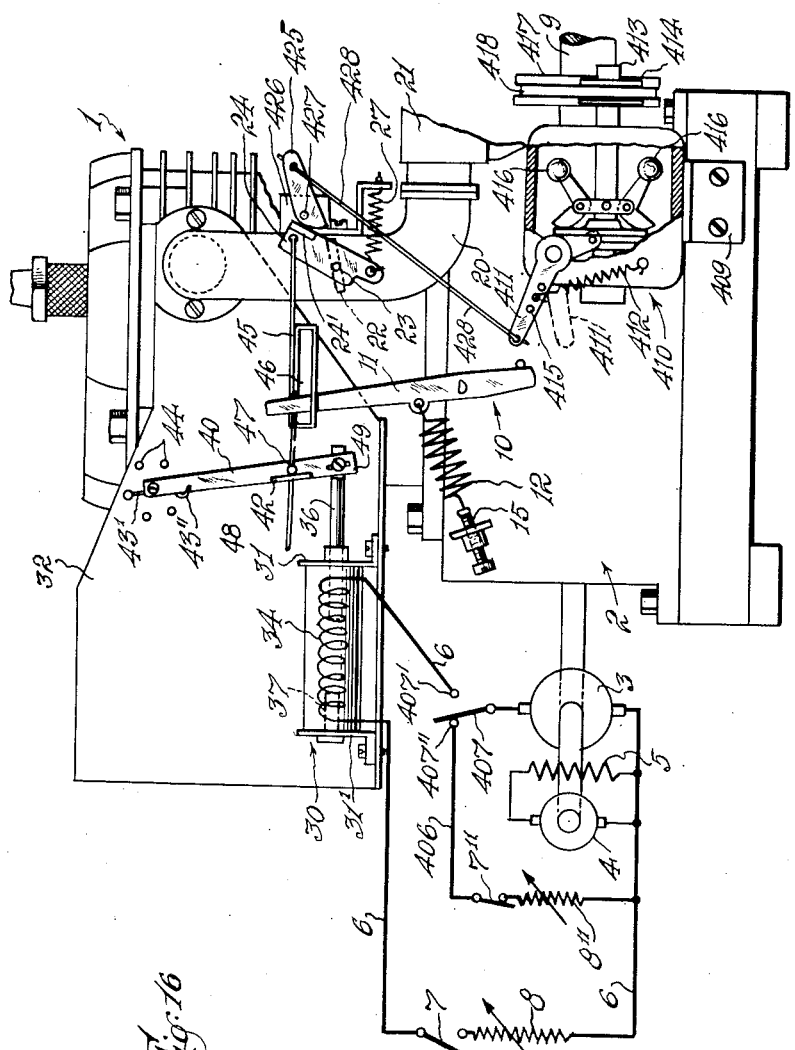

The invention will be more readily understood by reference to the accompanying drawings in which Figure 1 presents a diagrammatic view of the simplest embodiment of the invention with the engine maintained at idling condition, while Figure 2 is a similar view of the same embodiment with the engine in a condition immediately following a drop in generated voltage below the intended minimum. Figure 3 illustrates the same structure during load speed operation. A detailed side view of the mounting of the primary idling-enforcing means comprising the lever of Figure 1 is depicted in Figure 4, while Figure 5 shows a similar view of the idling governor arm or lever of Figure 1. Figure 6 presents another modification of the present invention providing a true governing control of idling speed with engine in idling condition, and Figure 7 showing the same at on-load condition. A preferred modification of the invention for A. C. generator sets is illustrated in Figure 8, in idling condition, the on-load condition of the same being shown in Figure 9, while Figure 10 shows the same embodiment during a period of acceleration to load-speed. An additional modification of a simple form of the invention, is depicted in Figure 11 in idling condition, with Figure 12 showing the same structure in a condition immediately following a drop in generated voltage below the intended minimum, and Figure 13 showing it at the on-load condition. Figure 11A is the embodiment of Figure 11 wherein a 3-position relay is employed. Figures 11B to 11F show details of the relay illustrated in Figure 11A. Figure 14 depicts an embodiment of the present invention when applied to engine loads other than electric generators, while Figure 14A shows a modification of the system depicted in Figure 14. Figure 15 presents a modification of the invention which provides for closure of the fuel throttle by means not independent of the governor, while Figure 16 depicts an embodiment employing a centrifugal type of idling condition speed governor. Similar numerals refer to similar parts in the various figures. In order to simplify the description, no attempt will be made to differentiate between "resistance" and "impedance," the term "resistance" being employed for both A. C. and D. C. circuits.

Referring again to the drawings and particularly to Figure 1, numeral 1 represents an internal combustion engine wherein only the essential elements are depicted, the engine having a crankcase 2 and driving a load generator 3 which may be A. C. or D. C. An exciter generator or armature 4 supplies current to a common field 5, although various types of generators and excitation systems may be substituted as required by individual applications. Generator 3 serves a load circuit 6, shown in bold lines. From the upper terminal of generator 3, load circuit current passes through a coarse coil winding 34 (to be described), thence through a load switch 7, thence through load 8 and to the lower terminal of generator 3. In practice, the load may consist of a variety of appliances or various types and sizes, which may have manual or automatic switches, or the load may be storage batteries to be charged intermittently.

As an engine governor, there is depicted generally a conventional centrifugal governor 10 having the usual operating lever or arm 11. The centrifugal mechanism (usually contained within the crankcase), is not shown. When the engine is running in Figure 1, arm 11 is urged rightwardly. The centrifugal effect is biased by governor loading spring 12 which has an adjustment 15. A stop 14 limits the leftward motion of arm 11. When engine 1 is running at below load speed, arm 11 remains as shown in Figure 1, at the leftward limit. Upon reaching load speed, arm 11 is driven rightwardly to partially close the throttle, as will be described.

The fuel intake system comprises intake pipe 20, carburetor 21 connected therewith, and a throttle assembly including throttle valve 22 pivotally mounted within intake 20 on pin 23, and throttle arm 24 which is fixed onto pin 23 and serves to actuate the throttle. In present engines, the throttle is integrally mounted with the carburetor, but these units are shown separately here for the sake of clarity. It will be understood that fuel intake systems in different types of engines may be somewhat different than herein illustrated, but all will include at least one controllable member by which fuel flow can be metered to provide the engine speed desired. An adjustable stop 25 supported by bracket 26 is provided for throttle arm 24 (which will be employed herein as the controllable fuel metering or flow-regulating member), so that regardless of any control forces applied, a predetermined minimum of fuel can flow to the engine cylinders. A light-acting auxiliary throttle-opening spring 27 is connected to the lower end of throttle arm 24 and to bracket 26 mounted on intake 20, and is of force sufficient only to move the throttle against friction and inertia when unopposed.

Numeral 30 represents generally an electromagnet having iron end brackets 31 and 31' mounted on an iron angle-shaped panel 32 which is attached to engine 1 by being clamped between intake 20 and the engine proper. A tube 33 supports a coarse winding 34 which is connected in series with load generator 3 and load 8 when switch 7 is closed. Winding 34 is sufficiently coarse to avoid over-heating and excessive load voltage drop at maximum load current flow. Iron plunger 36 is adapted to be drawn inwardly by winding 34 to make magnetic contact with iron core or stop 37. Upon closing switch 7, and assuming generator 3 is generating an adequate voltage, and that the initial or "cold" resistance of connected load 8 is not too high, current flow through winding 34 will be sufficient to draw plunger 34 inwardly and hold it in this position for the duration of normal load current flow.

A long lever 40, mounted on panel 32 at pivot stud 41 (more clearly depicted in Figure 4) has a flange 42 and a spring 43 with one end 43' anchored in an adjustment hole 44 in panel 32 and its other end 43'' disposed partially around lever 40 imposing a thrust urging it rightwardly. A rigid link 45, made of tempered wire or similar material, is swively connected with throttle arm 24 at one end, while the other (free) end 48 rides slidably in a hole in flange 42. Link 45 has a formed loop 46 which surrounds governor arm 11 in a manner whereby arm 11 cannot exert any effect to open throttle 22 but, during on-load operation of the engine, arm 11 can effect closure to the necessary extent, of throttle 22. Small ball 47 is brazed or otherwise affixed to link 45, forming a thrust element against which the force of spring 43 may be impressed via flange 42, on throttle arm 24. Lower end 49 of lever 40 is connected pivotally to plunger 36 so that inward motion of the plunger will enforce leftward movement of lever 40 and rightward movement of lever 40 will enforce motion of plunger 36 outwardly of its winding 34. Spring 43 is of stronger force than spring 27 so that, aside from any other forces, the normal condition is for throttle arm 24 to be lightly pressed against stop 25 holding throttle 22 at a selected fixed limit of closure, as shown in Figure 1.

Thus far, there has been described an engine-driven generating set with a fuel intake system, load governing system and idling system, with an idling speed and generated voltage obtainable as may result from operation with the throttle valve at a certain selected fixed limit of closure. When load switch 7 is closed, plunger 36 will be pulled inwardly, moving lever 40 leftwardly. Simultaneously, spring 27 will drive throttle 22 openwardly to remain fully open as long as necessary for the engine to take on load and achieve load speed, after which governor arm 11 will move rightwardly as necessary to bear against the right portion of loop 46 to govern speed for the duration of load, as illustrated in Figure 3 wherein plunger 36 is locked inward magnetically and loop 46 is pressed lightly by arm 11 to govern throttle 22. When switch 7 is opened to terminate load, spring 43 will move lever 40 rightwardly thereby moving plunger 36 outwardly and also closing throttle 22.

In order to avoid engine operation difficulties which may occur when merely a fixed minimum throttle opening is maintained for idling operation, the following additional control system is employed:

An electromagnet designated generally as 50 has iron end brackets 51 and 51' mounted on iron panel 32. The usual tube 53 supports a winding 54 which is connected in shunt with D. C. armature 4 by virtue of wires 58 and 59. Plunger 56 is slidably disposed within tube 53. Fixed iron core or stop 57 also is provided. The wire for winding 54 should be of sufficiently small size to prevent over-heating during such periods as when the engine is operating at load speed. Thus, winding 54 is only slightly energized when the system is operated at slow idling speed, but the light energization would be sufficient to hold plunger 56 relatively tightly engaged with core 57 once the two are brought into at least substantial contact.

Lever 60 is pivotally mounted on panel 32 by means of stud 61, as shown in detail in Figure 5. Spring 63 has one end 63' anchored in an adjustment hole 64 in panel 32, while the other end 63" is hooked around lever 60 to exert force on it tending to rotate it in a clockwise direction. Wire link 65 is swivelly connected with lower end 62 of lever 60 and is in slidable relation with flange 42 by riding in a hole therein. Bent portion 300 of link 65 serves as a thrust member against which clockwise motion of lever 60 will enforce leftward motion of lever 40, in turn permitting spring 27 to advance throttle 22 to a wider throttle position than the preadjusted minimum. An adjustable stop 66 limits the clockwise motion of lever 60. Upper end 69 of lever 60 is swivelly attached to plunger 56. In the position deposited in Figure 1, plunger 56 is magnetically locked to core 57 thereby holding lever 60 at its most counter-clockwise limit of motion and thus the idle speed governing system is ineffective, since spring 63 makes lever 60 effective in freeing throttle arm 24 for opening of throttle 22 only when winding 54 has not yet pulled plunger 56 inwardly in locking position with core 57. The idle speed governing system is operatively effective when lever 60 is disposed against stop 66, in which case hook 300 pulls lever 40, thereby permitting spring 27 to open throttle 24 to the extent permitted by ball stop 47.

During the idling period, plunger 56 will remain magnetically engaged with core 57 only as long as a certain predetermined minimum voltage is generated by D. C. armature 4. In the event of loss of voltage, due to slowing down of the engine because of fouling up after a long idling period, for example, energization of winding 54 will be sufficiently weakened so that spring 63 will pull plunger 56 away from core 57, and lever 60 will be moved clockwise against stop 66. This causes hook 300 to pull lever 40 leftwardly, resulting in a limited throttle advance by action of spring 27, as is apparent from Figure 2 which shows the idle speed governing system in operation immediately following loss of generated voltage effected by stoppage of the engine, for example. The degree of throttle advance effected by this operation is selected to be sufficient not only to regain the desired idling speed, but also to provide acceleration well above the usual idling speed, so that generator voltage is built up to a sufficient degree that winding 54 is adequately energized to move plunger 56 against the force of spring 63 to engage core 57, whereupon spring 43 will be free again to pull lever 40 to force rod 45 to close throttle arm 24 against stop 25, thereby continually enforcing the idling speed. If the engine is cold or fouled excessively, it may again slow down and the cycle will be repeated until the engine is operating satisfactorily at the idling speed selected, as determined by stop 25.

When load switch 7 is closed, the resulting energization of winding 34 by the load circuit current, will draw plunger 36 inwardly, as outlined in copending application Serial No. 453,911, filed on September 2, 1954, by William E. McFarland, of which this application is a continuation-in-part, thereby moving lever 40 leftwardly to make ineffective the fuel limiting effect upon the throttle, whereby acceleration will follow by normal operation of the load speed engine speed regulating system, with load speed governing as was already described. During this load speed period, winding 54 is highly energized and plunger 56 is locked inwardly as in Figure 3.

It is apparent that electromagnet 50 of the idle speed governing system performs a speed and voltage governing function in that it enforces generated voltage (and thus engine speed) to be maintained at or above a certain minimum. Yet, it is not a true speed governor in the ordinary sense that it will tend to act upon every deviation from a normal. The type of regulation that is afforded, however, is obtainable from a small and weakly energized electromagnet. In the case of certain types of engines which tend to foul badly during long idling periods, the considerable degree of temporary acceleration which may be afforded by the cyclic action of the idle speed governing system of Figure 1 will tend to clear out the cylinders better than would a true governor. As can be seen from the figures, there can be considerable latitude in the manner of using the device. For instance, if the stop screw 25 is adjusted to allow almost complete throttle closure, the cycle of action of electromagnet 50 will be more or less continuous and rhythmical and the engine speed will be within certain high and low limits, but will be constantly changing. In such event, the action of the electromagnetic control will be that of a governor in which "hunting" tendency is extreme, as the design of electromagnet 50 is such that when its plunger begins moving in either direction, it will tend to move to the limit and will not move again until a major change in engine speed occurs.

As is apparent from the first three figures, electromagnet 50 does not act on throttle 22 directly but acts upon the idling speed enforcing system, particularly lever 40 thereof, to make partially ineffective the fuel limiting effect on the throttle as effected by the action of spring 43 upon lever 40. This particular manner of obtaining necessary throttle advance to enforce minimum idling speed and minimum generated voltage is one way of obtaining operative connection of electromagnet 50 with throttle 22. In practice, it may be desirable to employ various connections and arrangements whereby the action of electromagnet 50 results in the necessary increase in fuel flow through the intake system, so that the present invention is not limited to the connections shown in the drawings. Furthermore, it will be seen that if electromagnet 50, together with its necessary components, such as lever 60 and spring 63, employs a direct working connection with the fuel intake system, enabling engine fuel to be increased to a sufficient degree, it would be equally adaptable to various other applications where the engine load may be other than a generator, so long as there is a driven small generator available to supply suitable current to operate electromagnet 50.

In Figure 6 there is illustrated a similar arrangement of engine, intake system, load generators and load circuit and idling enforcing device of the type shown in Figure 1. Some elements, such as the adjustable stop screw 25 have been omitted as they are not essential. In this Figure 6, the electromagnetic idle speed control system provides true governing of idling speed and generated voltage within close limits, but is somewhat more complex than the system presented in Figure 1.

Electromagnet 50' has end brackets 51 and 51' mounted on iron panel 32, and the conventional tube 53 supports winding 54'. Plunger 56 is slidable in tube 53 and its left end has attached thereto a small non-magnetic rod 55 terminating with bent stop 55', said rod being free to move through an opening in bracket 51'. There is no iron core or stop, such as 57 which was provided in the case of electromagnet 50 of Figure 1. Wires 58', 59' and 59" connect winding 54' in shunt with D. C. armature 4 during such period as switching contacts 73 and 73' are closed. Winding 54' is of sufficiently coarse wire as to be adequately energized to serve as an electromagnetic throttle governor on the basis of voltage generated at slow idling speed. If the D. C. energization is employed, plunger 56 may optionally be a permanent magnet. Since the idling speed voltage affords at least a relatively high energization of winding 54', the winding cannot be subjected to the voltage generated at load-speed for more than a brief period.

Lever 60 is pivotally mounted on stud 61 and is urged in the clockwise direction by the force of spring 63 as in Figure 1. Rod 65 connects lever 60 with lever 40 in the same one-way yielding fashion, whereby lever 60 can move lever 40 only in the leftward direction, and upper end 69 of lever 60 is swivelly connected to move plunger 56 outwardly. A switching device indicated generally as 70 includes mounting block 71 formed of insulating material and attached to panel 32. This block grips the current-carrying switch arms 72 and 72' which are of spring material and to which are affixed relay contacts 73 and 73' which are normally closed. Extension strip 74, also of insulating material, is affixed to switch arm 72. A small rod 75 is swivelly attached to lever 40 and is slidably supported by strip 74. Rod 75 has affixed to its length a ball 76 serving as a thrust member enabling leftward motion of lever 40 to spread arms 72 and 72' and thus open contacts 73 and 73'.

The positions of the various elements depicted in Figure 6 are those obtainable at no-load. Inward pull exerted on plunger 56 is biased by the force of spring 63 which, however, is not applied to plunger 56 fully, as lever 40 is connected to exert a predetermined force urging lever 60 counter-clockwise. The force of lever 40 comprises that furnished by spring 43 which is opposed to some extent by the force of spring 27. Upon any fall of voltage in generator 4, the pull on plunger 56 will diminish and lever 60 will be moved at least slightly in a clockwise direction, thus forcing lever 40 slightly leftwardly and spring 27 will accomplish a slight advance of throttle 22 to increase speed and voltage. Likewise, if generated voltage tends to rise above the governed normal, plunger 56 will be drawn inwardly, thereby permitting spring 43 to move lever 40 slightly rightwardly to reduce the degree of throttle opening. Thus, it can be seen that electromagnet 50' is arranged as a sensitive governor for governing the plant during a period of low speed or idle operation, and is required to accomplish movement of the throttle within only a relatively small range as compared with the full range of possible throttle motion. The action of electromagnet 50' makes possible a smooth and uniform slow idling of the engine and assures that a certain minimum voltage is continuously generated during idling periods. If the engine is stopped, the throttle will automatically be advanced to a sufficient extent in preparation for cranking, and when cranking takes place, the engine will keep accelerating until the generator builds up voltage.

When the engine is idling and load switch 7 is closed, lever 40 will be moved leftwardly by energization of winding 34. At least near the limit of the motion of lever 40 (as plunger 36 nears core 37), ball 76 will press strip 74 with sufficient force to spread open relay contacts 73 and 73', thereby interrupting energization of winding 54' for the duration of the connected load. The positions for such load-speed operation are shown in Figure 7, wherein governor arm 11 effectively engages the right end of loop 46 to regulate fuel intake for load operation. Plunger 56 is in fully extended position which would tend to prevent sufficient rightward motion of lever 40 to fully close the throttle upon opening of switch 7, but lever 40 will start moving rightwardly, which will enable contacts 73 and 73' to again close in time and cause re-energization of winding 54' without interfering with engine deceleration so that electromagnet 50' will take up governing of the idling speed.

A particular feature of Figure 6 is the provision of an electromagnetic idling speed governor which is energized for governing for the duration of the off-load period, and switching means responsive to initiation of load or equivalent engine condition arranged to protectively de-energize the governor and responsive at termination of load or equivalent engine condition to re-energize the governor. The switching control, as shown, is simple, economical and positive in operation, although other suitable switching means, such as a current relay with its winding in series with the load circuit, may be employed for the necessary switching operation.

When considering the systems outlined in Figures 1 and 6, it is seen that the necessary regulation of idling speed has been made easy and practical by utilization of a single throttle that is lightly controlled. Aside from the light pressure exerted by spring 27, the elements of the high speed governor system have no effect and exert no forces to interfere with sensitive and accurate regulation of idling speed. In one sense, the system as a whole comprises a fuel intake system having a throttle valve, a load speed governor adapted to limit throttle opening to the requirement of load speed operation, an independent low speed governor adapted to limit throttle closure for the conditions of low speed operation, and throttle control means responsive to initiation and termination of load and adapted to maintain the throttle advanced to the limit imposed by the load speed governor from the initiation of load, and retarded to the limit imposed by the load speed governor from the termination of load. With respect to this particular description of the invention, spring 27 would be considered as an element of the throttle control means rather than as an element of the load governing system. And also, either or both governors could be centrifugal or electromagnetic, as desired, and the low speed operation may be used to drive a load of limited power requirement or may merely be purely on idling speed condition, as required.

A preferred modification of the present invention wherein a source of A. C. generated current is available for energizing the low speed electromagnetic governor, is illustrated in Figure 8. In copending application Serial No. 467,351, mentioned heretofore, disclosure is made of an idling device including use of an initial load circuit of high resistance and utilizing certain switching control therewith whereby the idling control device responds in a sensitive and uniform manner to a wide range of sizes and types of loads, and the engine is not subjected to the burden of powering the load until after initial acceleration has been accomplished. The high resistance circuit thereof has been omitted in Figures 1 and 6 to simplify illustration, as the main benefits of the present invention are not directly concerned with those particular features of the idling device. From the practical standpoint, use of such a high resistance circuit is a necessity in an idling device for most average generator applications, excepting welding and, in addition, use of the high resistance circuit makes the idling device sufficiently sensitive so that a truly low idling speed is practical. This, however, tends to require a sensitive and responsive regulation of the fuel intake during the idling period. As one feature, Figure 8 illustrates the combined functions on the part of the low speed governor, whereby the switch for controlling the high resistance circuit is actuated by the governor.

Load generator 3 is an A. C. generator. Exciter 4 supplies current for field 5 which is common to both generators 3 and 4. Load circuit 6' is shown by a bold line and it begins with the upper terminal of generator 3 and passes through primary winding 91 of a current transformer, thence through switching relay contacts 123 and 123' when said contacts are closed, thence through load switch 7, load 8 and back to the lower terminal of generator 3. If contacts 123 and 123' are open, the circuit, instead of passing through these contacts, passes through high resistance winding 84 (to be described) and connects again with load circuit 6' by means of wire 89.

As in the case of the other figures, numeral 40 in Figure 8 represents a lever pivotally mounted on stud 41 as shown in Figure 4. Spring 43 exerts a force urging lever 40 rightwardly whereby, aside from any other force exerted on lever 40, throttle 22 will be held closed, since flange 42 bears on ball 47 fastened to connecting link 45, the force of spring 43 being greater than that of 27. An electromagnet generally designated as 80 is mounted on panel 32 by means of iron end brackets 81 and 81', and it also has the conventional tube 83 supporting a front coil winding 84 and a rear winding 85 separated by nonmagnetic separator 8. Plunger 86 may be pulled inwardly from its extended position by suitable energization of front winding 84 and can be held magnetically locked in contact with iron core 87 by suitable energization of either winding, although winding 85 is provided as the holding winding.

Current transformer 90 is designed to have a low impedance primary winding so as not to cause appreciable voltage drop even at maximum load current flow. Core 92 is of high permeability material. The output of the secondary winding 93 passes through the selenium or other similar rectifier 94 connected to winding 85 so as to hold plunger 86 in inwardly withdrawn position once it is so positioned and so long as there is a certain predetermined adequate minimum of load current flow of normal frequency passing through primary winding 91. Thus far, with the exception of describing how contacts 123 and 123' are actuated at the proper times and also with the exception of showing how throttle 22 is held sufficiently open to sustain a suitable idling speed, there has been described a complete and sensitive idling control system in combination with a typical generating set and representative of several modifications of idling devices in the aforesaid Serial No. 467,351.

The requirement as to contacts 123 and 123' is that they be placed in the open condition at least by the time switch 7 is initially closed to connect a new load, and that they be placed in the closed condition as soon as acceleration to load speed has taken place. The positions of the elements in Figure 8 are those at the time the engine is idling at no-load. Spring 43 is effective in maintaining throttle 22 in closed condition and plunger 86 in extended position. Spring 12 urges governor arm 11 to its most leftward position so that it has no effect upon the fuel intake system.

When switch 7 is closed, the A. C. current flow from generator 3 takes place through high resistance winding 84 having a resistance value higher at least than the initial or starting resistance of the usual load, even though the load is a small one, so that winding 84 is practically in shunt with A. C. generator 3. Plunger 86 is pulled inwardly to move lever 40 leftwardly, and unopposed spring 27 acts to open throttle 22 to the limit when plunger 86 makes contact with iron core 87. The engine, having no significant burden, will accelerate quickly, tending to accelerate a little beyond normal load speed during the time lag required by governor 10 to move its arm 11 rightwardly to reduce the degree of throttle opening. Provision must be made for closing contacts 123 and 123' to apply working voltage to the load at least by the peak of acceleration. Upon closing of these contacts, the high resistance circuit comprising winding 84, is by-passed, and normal load current thereafter flows through circuit 6' which energizes winding 85 for the duration of connected load, holding lever 40 leftward while governor arm 11 is bearing against the right end of loop 46 and thus is effectively connected with throttle arm 24 to regulate the fuel intake system for load speed operation. When switch 7 is opened, winding 85 is de-energized and lever 40 moves rightwardly, again tending to close the throttle completely.

As the low speed electromagnetic governor system for this plant, there is included an electromagnet designated generally as 100, having iron end brackets 101 and 101' mounted on iron panel 32. The usual tube 103 supports winding 104. Plunger 106 may move outwardly of winding 104 as permitted by stop 105 and may move inwardly to make contact with iron core 107. Winding 104 is connected in shunt with A. C. generator 3 by wires 108 and 109, and winding 104 is as coarse as is practical, considering that it is subjected (during load speed operation) to the maximum voltage generated by generator 3. During load speed operation, plunger 106 is held engaged against core 107 (as will be described) to obtain the benefit of the maximum reactance which electromagnet 100 can afford, which enables winding 104 to be fairly coarse and moderately well energized by the idling speed voltage of generator 3, so that electromagnet 100 has sufficient power to be used as a normally sensitive and accurate governor, considering especially that it is required to control the throttle through only a portion of the possible throttle motion.

Lever 110 is pivotally mounted on stud 111 similarly to the mounting of lever 60 as shown in detail in Figure 5. Spring 113 has one end 113' anchored in an adjustment hole 114 and an end 113" is hooked onto lever 110, exerting a force tending to rotate it clockwise. A rigid small rod 115 is swively connected to the lower end 112 of lever 110, while its other end rides slidably in a hole in flange 42 on lever 40. Rod 115 has an adjustable collar on its free end which may be adjusted to bear on flange 42 to move lever 40 a limited distance leftwardly during clockwise motion of lever 110. Upper end 119 of lever 110 is swively connected to plunger 106. Spring 117 has one end attached to the lower end 112 of lever 110 and its other end slidably riding in a hole in bracket 118. The end of spring 117 extending out of bracket 118 has an adjustment collar 117' for adjusting the time when spring 117 begins to exert its tension. When lever 110 is rotated counterclockwise beyond a certain position, spring 117 will begin to exert tension thereon. Adjustment of collar 117' ordinarily is to be such that spring 117 is unstressed within the range of the normal working position of plunger 106, the plunger position as illustrated in Figure 8 being approximately representative of plunger 106 at the center of its normal range of motion during idling speed operation. However, spring 117 will be placed under significant stress at such time as plunger 106 moves so closely to core 107 that a significant sealing pull effect is exerted on the plunger.

It is apparent, therefore, that if plunger 106 is sufficiently near core 107, the position of adjustable collar 116 will be such that lever 40 can move sufficiently rightwardly so that throttle 22 can be nearly closed, or closed at least to such usual limit as is provided by the structure (no limiting means being shown, since it is not an essential requirement here). By adjustment of the position of collar 116 on link 115, the extent of maximum throttle opening (when plunger 106 is fully outward and bearing against stop 105) which can be effected by the electromagnetic governor can be selected and should be sufficient for cold cranking. The position of collar 116, however, should be such that lever 40 can move to close the throttle sufficiently for the requirement of the desired idling speed without plunger 106 approaching too closely the stop 107. If collar 116 is so adjusted that plunger 106 tends to stabilize (during idling) relatively near the core, the effective idling speed will be higher than otherwise, since spring 117 then will be stressed to some extent continuously so that in such case both springs 113 and 117 will act as loading springs for the electromagnetic governor. Thus, upon adjusting the position of collar 116, certain selective adjusting of the effective idling speed may be made, and this is accomplished without actually increasing or decreasing (adjusting) the force of the springs acting upon the electromagnetic governor.

In this manner, the electromagnetic governor is provided with two biasing springs, one effective over the entire range of plunger motion, the other effective only during a portion of the range of plunger motion, being that portion available when plunger 106 is more inward of its winding 104. And the linkage between the electromagnetic governor and the throttle is adjustable in length so that governing may be achieved at relatively outward positions of plunger 106 as biased by only one spring, or governing may be accomplished at higher governed speed at relatively inward positions of plunger 106 as it is biased by two springs. While the usual method of changing the effective governed speed in the case of an electromagnetic governor is to either change the tension of the biasing spring or to change the degree of electrical energization, there has been especially provided linkage adjustment 116, and the spring biasing of the governor must be in accordance with the requirement of the switching operation and, once effected, should not thereafter be changed. Adjustment 116 is illustrated as a collar for simplicity, but it may be a conveniently operable knob or thumb-screw or similar device.

A switching device indicated generally as 120 is operated through the motion of lever 110. It includes mounting block 121 of insulating material which is attached to panel 32, and it holds current-carrying switch arms 122 and 122' made of spring material. Attached to the switch arms are contacts 123 and 123' which may be conventional relay contacts and which are normally open. An extension strip of insulating material 124 is affixed to arm 122 and it slidably supports one end of a small link or rod 125, one end of which rides therein, and which has its other end swivelly attached to lever 110. Rod 125 has a hooked end 302 serving as a stop and engaging means, arranged so that when lever 110 is moved counter-clockwise to its limit as determined by contact of plunger 106 with core 107, a pressure is exerted upon arm 122 sufficient to close contacts 123 and 123'. As depicted in Figure 8, the contacts must carry the load current. If the generating plant is a large one, it will be understood that contacts 123 and 123' could be used for merely controlling a sufficiently large relay switch through which the actual load current would pass.

The positions of the various elements in Figure 8 are shown for the engine idling period with spring 43 in fuel-limiting position tending to close throttle 22. Sufficient throttle opening for maintaining a uniform slow idling speed and the generation of minimum voltage is assured by the electromagnetic governing system disposed in the upper left hand corner of the figure. Plunger 106 is urged inwardly by A. C. energization of winding 104, but its action is biased by the combined effect of several springs. Assuming that collar 116 is adjusted and that spring 117 is normally unstressed (i. e. when the engine is in idling condition), then spring 113 is the principal element of bias, its force and effect being slightly reduced by the light throttle closing pressure exerted by spring 43. The basic bias, as determined largely by spring 113, must be such as to enforce an idling speed which will generate sufficient voltage from generator 3 to properly energize winding 84 upon connection of load. If engine 1 is idling and load switch 7 is closed, the energized winding 84 will effect an open throttle and acceleration, as already outlined, which will increase the voltage and frequency of generator 3 which voltage, in turn, will increase energization of winding 104 as well as the pull on plunger 106, while the increase in frequency partially offsets the increased pull.

As acceleration proceeds above idling speed, plunger 106 moves inwardly against the resistance of both the basic biasing spring 113 and the now stressed spring 117. When plunger 106 has completed most of its inward movement, link 125 begins to exert pressure on switch arm 122. Since switch arm 122 is a spring, it impresses a bias on lever 110 in the same manner and direction as spring 117, and its effect must be allowed for in the design of spring 117. It is also possible to design the switching device so that it incorporates sufficient yielding resistance against the latter portion of counter-clockwise motion of lever 110, so that spring 117 is not required.

In any event, the resistance afforded by the springs is designed so that plunger 106 will move reasonably near core 107 during the accomplishment of acceleration and that a reasonable size gap remains between plunger 106 and core 107 until an acceleration has been achieved which is substantially near load speed. Figure 10 depicts the engine system in the condition of engine acceleration approaching load speed. It will be observed that plunger 106 has been pulled in toward core 107, but that there is an air gap therebetween, so that rod 125 has yet been unable to close contacts 123 and 123' for short circuiting winding 84 from the load circuit. When engine load speed is reached, the engine system is in the condition shown in Figure 9. At this point, the sealing pull on plunger 106 should become sufficient to complete the final motion of the plunger in one quick pull, thereby accomplishing closure of contacts 123 and 123' in a positive manner such as that achieved in commercial relays. Since electromagnet 100 is A. C. energized, there may be a slight buzzing or chattering (unless a shading coil is employed), but plunger 106 and core 107 will at least remain in substantial continuous contact. At this point, load 8 now is served normally by the plant. The tendency of winding 104 to heat up is very moderate since frequency is normal and the air gap of electromagnet 100 is closed.

Figure 9 illustrates the positions of the various elements during the on-load period. Spring 27 holds throttle 22 advanced to the proper limit for load speed operation with respect to the particular size of load 8, the limit of throttle opening being determined by the position of governor arm 11. Upon opening of switch 7 to disconnect or terminate the load, lever 40 will be moved rightwardly to close throttle 22, resulting in immediate deceleration of the engine. Plunger 106 will be magnetically held against stop 107 until say 50% or more deceleration from load speed has been accomplished, whereupon, because of the lowered frequency and voltage the magnetic grip on plunger 106 will become inadequate and it will be forcibly propelled outwardly into working position to take up the idle speed governing. Contacts 123 and 123' are now open to assure that winding 84 will be energized upon the next connection of load.

A comparison with the arrangement of Figure 6 will show that a special advantage of the structure shown in Figure 8 is that no switching control of the energization of the electromagnetic idle speed governor is required. Such a system requires use of A. C. energization of the governor and it is usually preferred that the energization be provided by the load generator. A particular advantage of the arrangement in Figure 8 is that electromagnet 100, in addition to serving as a governor, operates the switching device 120 at the required predetermined points of acceleration and deceleration.

For clarity of illustration, all three structures depicted in Figures 1, 6 and 8 have been provided with a very similar plan of mechanical connection, both with respect to the electromagnetic idle speed regulating means, the fuel limiting arm 40 as urged by spring 43, the throttle connecting link 45, the throttle assembly, and governor arm 11. In practice, however, requirements of various engine and fuel intake designs and details vary greatly, so that connections and controls must be varied accordingly, as has been outlined in copending application Serial No. 467,351. A primary principle of the idle speed governing system as herein described is that the low speed governor or regulator unit should act to limit variably the degree to which fuel intake is shut off by the action of the basic idling control device. For the practice of the present invention, it is merely necessary to make such a working connection between the low speed governor and the fuel intake system as to admit the engine fuel as required. In effect, there is provided a one-way yielding connection between the idling speed governor unit and the throttle whereby fuel intake is governed effectively or regulated adequately to sustain the idling speed and yet enable free increase of fuel intake independently of the idling speed governor.

Another modification of the present invention in which idling speed is regulated is illustrated in Figure 11. Here the manner of regulation is similar to that accomplished by the arrangement of Figure 1, but an entirely different structure is employed. The system outlined in Figure 11 is particularly suited as a simple and inexpensive system for use where the basic idling control system inherently requires the use of an electromagnet which not only has an operative connection to cause advance of the throttle when energized, but also has a winding of resistance suitable for proper connection of the winding in shunt with one of the driven generators. It also serves to illustrate use of the present invention when more than one throttle valve in series are used in the intake system.

In Figure 11, the basic elements are the same or similar to those in the previous figures. Throttle arm 24 is shown as connected to governor arm 11 by a rigid link 28, while an auxiliary throttle control 22' is provided in intake 20 and is carried on pin 23' affixed to throttle arm 24' which may rest against adjustable stop 25' carried on bracket 26', the stop being adjusted to permit sufficient fuel to pass throttle 22' so that satisfactory idling speed will tend to be sustained. In conventional gasoline engines of the 4-cycle type, it is generally imperative to employ only a single throttle valve. But in some engines, the fuel limiting effect for idling control must be imposed through use of an additional fuel valve, as the governed valve may be of such type or so located in the engine that working connections are impractical. The simple and satisfactory practice of the present invention as well as the simple and satisfactory practice of utilizing a high resistance load circuit for initial acceleration is to a great extent dependent upon the use of a fuel intake system which may be lightly controlled during the idling period, and this requires that the load governor be arranged so that it cannot strongly oppose the shutting off of the fuel intake. Either the single throttle system employing the freely yielding connection between load governor and throttle; as shown in Figures 1, 6 and 8, or the multiple throttle system generally represented by Figure 11 enables positive application of fuel limitation effect to enforce idling speed, and positive regulation of fuel to sustain idling speed, all of which are accomplished with light-acting control forces as may be derived by small electromagnets energized by generated current.

Lever 40', which is urged rightwardly by spring 43, is similar to lever 40 of the preceding figures. A rigid rod 45' connects lever 40' with throttle arm 24'. Electromagnet 80 is the same as that shown in Figure 8, and the normal effect of spring 43 is to maintain lever 40' rightwardly, plunger 86 extended, and throttle arm 24' pressing stop 25' so that throttle 22' is closed to a predetermined fixed degree but permitting fuel flow tending to support a satisfactory idling speed when the engine condition is favorable. A single-pole double-throw voltage relay indicated generally as 160, has a center contact 163, an upper normally-closed contact 163' and a lower normally-open contact 163". Its operating coil 164 is in shunt with exciter armature 4, and the relay design is such as to cause it to pull in to close contacts 163 and 163" when engine acceleration has progressed substantially to load speed with full voltage being generated.

Another voltage relay 170 has normally-closed contacts (the dotted line in Figure 11 indicating closed contact position) 173 and 173' and an operating coil 174 in shunt with exciter generator 4 through wires 168 and 169 which serve the coils of both relays. It is well known that certain types of inexpensive and rugged standard voltage relays will pull in upon application of a voltage that is less than one-half of the continuous voltage that may be applied to the coil, and that once the armature has been pulled in, it will hold against dropping out, down to a voltage that is less than one-fourth of the continuous voltage which may be applied to the coil. The drop out point of relay 170 (i. e., the point at which its contacts will close) is selected as being just below the voltage which is desired to be steadily generated by exciter 4 during idling operation. This results in the relay pulling in with certainty at any time there is significant acceleration of the engine from idling speed toward load speed. A variable resistance 175 is provided in series with relay coil 174 to enable easy adjustment of the drop-out point.

The load circuit 6" is indicated by a bold line. Starting with the upper terminal of generator 3, it passes through primary winding 91 of current transformer 90 which is the same as that shown for Figure 8, and energizes holding winding 85 for the duration of normal load current flow. Circuit 6" then continues through relay contacts 163 and 163" (when closed), thence through load switch 7, load 8, and returns to the lower terminal of generator 3. If, however, contacts 163 and 163' are closed, load circuit current then must pass through the high resistance winding 84, and thence through wire 89 to rejoin the load circuit 6". Wire 166 connects relay contact 163' with relay contact 173'.

The positions of the elements depicted in Figure 11 are those of engine idling at normal idling speed, at which contacts 163 and 163' are closed as the voltage of exciter armature 4 is inadequate to pull in relay 160. However, relay contacts 173 and 173' are open so long as the intended minimum voltage is steadily generated by generator 4. If engine 1 falters in speed (as sometimes occurs during warm-up periods or upon engine-fouling) the voltage of armature 4 will drop to the critical minimum whereby relay 170 will drop out to close contacts 173 and 173'. This inserts the high resistance winding 84 in shunt with load generator 3, the circuit from the upper terminal of generator 3 leading through transformer primary 91, winding 84, wire 89, a portion of load circuit 6", through relay contacts 163 and 163', through wire 166 and thence through contacts 173 and 173' and thence through wire 168, connecting again with load circuit 6" near the lower terminal of generator 3. It is apparent that shunt energization of winding 84 could be obtained without involving the use of contacts 163 and 163', but the wiring diagram as shown in Figure 11 tends to avoid accidental short-circuits.

Since the resistance of winding 84 is such that it is normally practically in shunt with generator 3 when serving its purpose at initiation of load, it is suitably energized upon closing of contacts 173 and 173' as the voltage of generator 3 is (as is the case of voltage of generator 4) only just slightly below the intended normal for the period without load. Plunger 86 will immediately start moving inwardly, carrying lever 40' leftwardly, but only to the position illustrated in Figure 12. A cam arm 140 is mounted on stud 141, the mounting details being similar to those of the lever shown in Figure 5. Spring 143 has one end 143' anchored in a hole 144 in panel 32 and the other end 143" is hooked on arm 140, urging it counter-clockwise against a cam roller 145 mounted on lever 40'. At the idling speed positions of Figure 11, the force of cam arm 140 has no effect. But when lever 40' has been moved leftwardly to the extent shown in Figure 12, the cam tends to obstruct further motion of lever 40'. Throttle 22 now is moderately open and acceleration is progressing and, if permitted to continue, will result in sufficient pull exerted on plunger 86 to overcome the obstructive force of cam arm 140 and complete the motion of lever 40', as in Figure 13. However, it is sufficient for the purpose of precautionary regulation of the idling speed that the acceleration be interrupted after a modest rise in the voltage of generator 4, so the relay 170 will pull in after modest acceleration, opening contacts 173 and 173' so that spring 43 will restore the effective positions of Figure 11 with throttle 22' again closed. If the engine is not yet sufficiently warmed or cleared of fouling, the voltage of armature 4 will again fall and the cycle again will be repeated as necessary to provide continuous operation of engine 1.

At such time as switch 7 is closed to connect load, the initial current flow is through the high resistance winding 84 since the contacts 163 and 163" are open during the idling period. This energization quickly changes operating positions from those shown in Figure 11 to those shown in Figure 12, and when acceleration has progressed sufficiently, the pull on plunger 86 is strong enough to overcome the obstructive effect of cam arm 140 and positions will be shown as in Figure 13. Auxiliary throttle 22' now is fully open enabling rapid completion of acceleration to load speed. At approximately full speed, energization of relay 160 is sufficient to cause closure of contacts 163 and 163″ to by-pass high resistance winding 84 and thus establish the normal load circuit. Governor arm 11 (which heretofore has remained stationary in the position shown in Figure 11) now will move rightwardly to arrest the acceleration and will move as necessary thereafter to regulate the intake system for load speed operation. The now-energized winding 85 will lock plunger 86 inward so that throttle 22′ is fully open and exerting no restrictive effect for the duration of load. Upon opening load switch 7, spring 43 is made effective to again close throttle 22′. Upon partial deceleration, relay 160 will drop out and positions will again be as shown in Figure 11, and if deceleration progresses too far as is likely if the engine has been highly heated by pulling a heavy load, contacts 173 and 173′ will immediately close to sustain the minimum idling voltage and speed as described. It is apparent that the particular advantage of the system of Figure 11 is that the necessary precautionary control of idling voltage and speed is obtained merely by adding a standard type voltage relay 170 to the particular type of idling device employed in the structure.

Figure 11A illustrates an improvement on Figure 11, but only with respect to a simplified relay switching system, which has been developed especially for applications involving the use of three switching positions, and which is particularly suitable for use in generator sets equipped with an idling device. Figure 11A is only a partial view, since all elements are the same as Figure 11, with the exception of the relay switch.

In Figure 11A, the two relays 160 and 170 of Figure 11 are omitted and, instead, there is provided the new type of relay 180, which is illustrated in detail in Figures 11B to 11E. This relay has an operating winding 184, in shunt with the D. C. armature 4 through wires 168 and 169. The relay is of the single-pole double-throw type, and has center contact 183 which is carried by the movable armature of the relay, also an upper contact 183′ and a lower contact 183″.

So long as the plant (as operating at idling speed) generates the intended minimum of idling voltage, center contact 183 will remain in a centered position since, at this condition, the armature of the relay is stabilized at a position midway of its possible motion.

If load switch 7 now is closed, initial flow of current necessarily flows through the high resistance winding 84, which will cause acceleration to full operating speed and, approximately at full speed, winding 184 will be sufficiently energized to pull in the relay to close contacts 183 and 183″. This switching action by-passes winding 84, and normal voltage will be served to the load for as long as the load remains connected. When switch 7 is opened, deceleration to normal idling speed will occur, and at some point midway of deceleration center contact 183 will be moved back to the intermediate position illustrated in Figure 11A. If, during the period of idling, the engine falters and voltage of the D. C. armature 4 drops sufficiently, contacts 183 and 183′ will close. This places high resistance winding 84 in shunt with A. C. generator 3, the circuit starting with the upper terminal of generator 3, follows load circuit 6″ thence through winding 84, thence through wire 89, thence through a short section of circuit 6″, thence through contacts 183 and 183′ and thence through wire 168 to join load circuit 6″ near the lower terminal of generator 3. As described for Figure 11, engine acceleration will occur which simultaneously raises the voltage of D. C. armature 4, and thus, after a small or a moderate amount of acceleration (according to the particular design of relay 180), contacts 183 and 183′ will be separated, and contact 183 will become centered again as in Figure 11A. As a result, the already simple control of Figure 11 is beneficially further simplified by the inclusion of the improved three-position relay of Figure 11A.

Figures 11B to 11E illustrate a relay with particular improvements for controlling the necessary switching in an idling control system especially of the type incorporating a high resistance engine-unburdening acceleration circuit. This is a 3-position relay used as a voltage relay. It is shown as a single pole relay, with only the center (movable) contact, an upper contact, and a lower contact, as this contact arrangement is sufficient to meet requirements when the circuit is arranged so that the high resistance (acceleration) circuit is removed from in series with the load circuit (upon accomplishment of acceleration) by merely short-circuiting the terminals of the high resistance element.

Relay 180 has a base 181 of insulating material, on which is the main relay frame 182 having an inclined extension 182′. Center contact 183 has upper and lower faces to engage with either upper contact 183′ or lower contact 183″. Operating coil 184 is carried by the plastic spool 186, and surrounds iron core 185. Armature 187 is rockably mounted on main frame 182, resting on a bearing surface 199. The armature has a bent-down extension 187′. Contact 183 is affixed to a spring-tempered current-carrying strip 188 which is riveted to armature 187. A conventional spring 189 is stretched between armature 187, and a pin, 190, and tends, in the usual manner, to hold armature 187 in raised position.

Affixed to frame 182 is a formed bracket 191 having a portion 191′ serving as a rest for the free end of a stressed flat spring 192, the spring being firmly held at the lower end of bracket 191. Upstanding arms 193 and 194 are mounted to insulating block 181. Two screws 195 accommodate external wiring connection to contacts 183″ and 183′, while a third screw 195 is connected through a braided pig-tail wire 196 to contact 183. Leads from winding 184 are brought out for external connections at screws 197. A permanent magnet 198 is rigidly attached to the armature extension 183′.

Figure 11D shows the normal or de-energized positions, the armature up, and the permanent magnet 198 is relatively close to the armature, aiding in firmly closing the contacts and preventing the upper contacts from making and breaking on too close a differential. To simplify explanations, it will be assumed that the normally desired idling speed voltage, as applied to winding 184, is 8 volts, and that the voltage applied to winding 184, on the basis of load speed operation of the plant, is 32 volts.

Prior to cranking the engine, the Figure 11D position is in effect. This position assures that, after cranking, the engine throttle will be significantly open and engine speed will climb toward load speed. When engine speed is such that 16 volts is applied to winding 184, the armature will break cleanly away from the upper position, opening contacts 183 and 183′ which, in turn, permits closure of the engine throttle, and some deceleration. The downward movement of the armature, however, was arrested at the Figure 11B position, as spring 192 obstructs further downward motion of the armature. The engine will decelerate somewhat, but ordinarily will run steadily at a speed to provide 8 volts to winding 184, in which case armature 182 will remain steadily at the Figure 11B position. Should the engine falter, with at least a momentary drop in coil voltage to 6 volts, the armature will break cleanly from the center position of Figure 11B and return again to the Figure 11D position, to enforce a fresh acceleration of the engine, which in turn will cause generation of sufficient voltage to again establish the Figure 11B position.

When load is connected, engine acceleration must occur, which will result, at the completion of acceleration, in 32 volts being applied to operating coil 184. When this voltage is reached, the armature will break cleanly from the Figure 11B position, to assume the Figure 11C position, with contact 183 and 183″ closed. Both flat spring 192 and coil spring 189 are now urging the armature upwardly, but the Figure 11C position will be in effect so long as voltage applied operating coil 184 remains above about 18 volts. Upon termination of load, the engine will begin to decelerate and at such time as this causes reduction in voltage applied to coil 184 to 18 volts, the armature will break cleanly from the Figure 11C position, but will then hold the Figure 11B position until such time as the coil voltage drops to 6 volts or again rises to 32 volts.

It will be seen that the particular feature of relay 180 is that, by means of a single relay which is only slightly more complex than typical standard voltage or current relays, there is obtained proper switching control for three different operating conditions. One switching status is in effect so long as a certain intermediate range of energization is provided to energize the relay, and this is the range of energization which will be obtained so long as the engine is running properly, once the generator has built up. Another switching status is in effect when under-energization is provided, as in the case of failure of the engine to maintain its intended idling speed. And the additional switching status is in effect when full energization is provided, as during load speed operation. In the operation of the relay with respect to three desired switching conditions, the motion of a conventional relay armature is obstructed at a midpoint of its range of motion in a manner whereby then substantially the full force of the obstruction means is completely and immediately effective when the armature has moved toward the core for a predetermined distance. The obstruction means comprises a pre-stressed spring and, particularly for simplicity use is made of a flat spring bearing on a rest, which is lifted from the rest when the relay armature is moved sufficiently toward the core.

Since a reasonable working clearance is desired both above and below the center contact when it is in the intermediate position, there is required a greater length of armature motion than in conventional relays, and use of a larger operating coil is needed which, however, will depend somewhat on the degree of contact pressure required with respect to the upper contact.

It may be noted that, with respect to the armature motion to and fro between the upper position and the intermediate position, that the armature is biased both by a conventional armature spring and by the pull of a permanent magnet. The air gap of the relay is at least relatively large when the armature is at either the intermediate or the upper position, tending to make for close differential operation of the upper contacts and a lack of brisk operation in breaking. The small permanent magnet is employed merely to improve the contacting characteristics and it is not essential to the principle of the three position relay, and has little effect except when the armature is at or near its most upward position.

This relay of Figures 11B to 11E should be applicable in many cases where two relays were hitherto required. Relay energization is provided by a single operating coil, used as a voltage relay, although it is obviously possible to employ the same type of device as a current relay. It is likewise apparent from the foregoing that energization of the relay may occur in the form of several different coil windings, each of which may contribute to the total energization of the relay to determine the switching position to be in effect.

Figure 14 illustrates the fact that the present invention is applicable to more general uses than that of protection against voltage and speed failure in generator sets operated at a no-load idling speed. An important aspect of the invention is that it is adaptable to protect and control the minimum fuel supply for sustaining idling speed, in such engine applications where it is desired or necessary to avoid constant manual supervision of slow speed operation, and in certain cases, the minimum or "idling" speed will be used in connection with certain load requirements on the engine.

In the case of generating set applications, there is always a speed governor for determining throttle positions when operating at the higher (load) speed. In general applications, the speed governor may be omitted, as a manual throttle lever may be more suitable for selecting the high operating speeds, which throttle lever will frequently be left unattended in one set position for extended periods. With respect to this invention, such a throttle lever may be considered as merely a substitute for a speed governor.

Also in the case of general applications, as for instance in air compressing applications, it may be desired to employ an automatic idling device whereby, upon predetermined air tank pressure, a pneumatic device acts to close off engine fuel supply and thus enforce idling speed. In some engine applications where an automatic (load responsive) idling device is not practical, it may be desired to provide electrical or mechanical remote control of idling so that the fuel supply to the engine can be remotely selected, either the idling fuel requirement or the high-speed fuel requirement, and without disturbing the position of a pre-adjusted manual throttle lever located at the engine.

As an example of the application of this invention to general usage, motor boat engines have been selected, such as ordinary outboard or inboard engines for small boats, this application having the feature that it is often required that the engine be operated at the slowest possible speed, but under a light load for slowly turning the boat propeller for trolling, as an example. The difficulties of engine stalling and irregular operation at trolling speeds are well known. In order to enable ready reference and comparison with the preceding figures which illustrate the generating set application, Figure 14 has arranged therein the engine, fuel intake system, manual throttle lever for high speed fuel selection, a manually operating "idling device" and the low speed regulator which is a particular element of the present invention, in as nearly the same positions as related elements as in the preceding figures.

A boat propeller 200 is driven from one end of the engine crankcase through a disengaging device 201, such as a clutch or gear case, and having a controlling lever 202 enabling propeller 200 to be entirely disconnected from the engine if desired, in which case the engine will be running without any load. A small permanent magnet alternator 203 is also driven by engine 1, and the drive may be from the opposite side of the crankcase than the propeller. Unless there is an additional specific current requirement from alternator 203, the latter may be quite small, generating say a few watts at slow idling speed operation of the engine. Alternator 203 may include a permanent magnet rotor 204 and stationary armature coils 205.

A panel 210 is supported by the engine and carries the throttle control apparatus to be described. A lever 220 is pivotally mounted on stud 221, the mounting being similar to that shown for a similar lever in Figure 4. A spring 223 has an end 223' anchored in an adjustment hole 224, and an end 223'' hooked onto lever 220 urging lever 220 to swing rightwardly. A locking latch 230 is mounted on a stud 231, similarly to lever 220, and a spring 233 having an end anchored in an opening in the panel 210, has an end around latch 230 urging it to move counter-clockwise. Latch 230 has a fingerpiece 232, and a pin 235 which limits the motion of the latch, the latch being arranged to engage and hold lever 220 at the dotted line position if lever 220 is manually moved to such position. A rigid link 240 of tempered wire is connected at its right end to throttle arm 24, and is slidably supported through a small opening in a flange 222 of lever 220. A small ball 241 is firmly affixed to link 240 serving as a stop and enabling rightward motion of lever 220 to be transmitted through link 240 to close the throttle. Link 240 is provided with loops 242 and 243 which serve the purpose of providing thrust surfaces or members to enable throttle control, as will be described. It will be seen that when lever 220 is held at the dotted line position by the latch, that spring 27 will tend to open throttle 22 fully. When latch 230 is actuated to permit lever 220 to move to the solid line position, lever 220, as urged by spring 223, tends to fully close the throttle against the effect of spring 27. Lever 220, with its associated elements, therefore is a form of manually operated idling control, and is used merely to select an open throttle position or a closed throttle position, but is not usable to determine or govern the speed. And the function of the lever 220 may be remotely controlled by the addition of suitable apparatus.

A manually positioned throttle control lever 250 is pivotally mounted at 251 on panel 210, and is provided with a knob or fingerpiece 252. A friction surface 254 is attached to panel 210 and tends to hold lever 250 in the selected operating position. Upper end 253 of throttle control 250 protrudes through loop 242 and the degree of throttle opening which may be provided by spring 27 (when lever 220 is at dotted line position) is thus determined by the selected position of the lever 250. Thus, throttle control lever 250 is used as a limit of maximum throttle opening, but has no ability at any position to enforce throttle opening.

An electromagnet shown generally as 260 has iron end brackets 261 and 261' and the conventional tube 263 supporting operating winding 264. Plunger 266 is slidable in the tube and, at extreme inward position, will make contact with a fixed iron core 267. Wires 268 and 269 connect winding 264 with permanent magnet alternator 203, a variable or adjustable resistance 262 being in series with this circuit. Plunger 266 is attached to a lever 270, which is pivotally mounted on stud 271 similarly to the mounting of a lever as shown by Figure 5. Spring 273 has an end 273' anchored in an adjustment hole 274 and an end 273'' engaged around lever 270 urging it to move clockwise. An additional spring 277 is attached at one end to lever 270, its opposite end being slidably disposed through an opening in a bracket 278. Spring 277 is of no effect at the position illustrated in Figure 14, but will become stretched as plunger 266 moves nearer core 267. Lower end 275 of lever 270 protrudes through loop 243 in such arrangement that, upon sufficient outward motion of plunger 266, throttle 22 will be advanced, at least to some extent, from its most closed position as determined by stop 25.

The positions shown in Figure 14 are those of the engine running slowly, as lever 220 has been released to apply fuel limiting effect. If control lever 202 is in position to connect propeller 200 with the engine, the engine will be under light load, and the boat will be propelled at minimum to trolling speed. Throttle control lever 250 then will be of no effect. The engine speed will be determined either by the adjusted position of stop screw 25, or by the electromagnetic slow (idle) speed governor comprising electromagnet 260 and associated elements, according to whether or not the selected adjustment of stop 25 is such as (when considered alone) it tends to provide higher engine speed or lower engine speed than the electromagnetic governor (when considered alone) would provide. If adjustment 25 is backed off sufficiently, engine speed will be controlled entirely by the electromagnetic governor, as energized by alternator 203, and the variable resistor 262 may be employed to select the exactly required engine speed. Spring 277 acts as a snub to prevent plunger 266 from momentarily moving too close to stop 267, but has no other effect. The possibility of engine stall is avoided, as governor 260 quickly will provide greater fuel flow if the engine begins to falter. As in the case of the generator set applications depicted in Figures 1 to 11, the low (idle) speed electromagnetic governor is so connected with the throttle that it has no other effect than to enforce a certain minimum of speed. If the normal (power) range of engine speed is now required, lever 220 is shifted over to the locked dotted-line position. Spring 27 immediately will advance the throttle to the limit determined by the selected position of lever 250, and engine speed will rise accordingly. This increases both the voltage and frequency of the energization supplied to electromagnet 260, but plunger 266 will be drawn somewhat inwardly in any event and will begin to stretch spring 277 and, at least if the engine speed is a rather high speed, plunger 266 will move fully inward and make and hold contact with core 267 until such time as lever 200 again is released to enforce deceleration. Due to the increase in frequency when operating at the higher speeds, and to the fact that the air gap in electromagnet 260 is at least lessened, winding 264 is adequately protected against burning out, without the actual necessity of being de-energized.

There has been shown a permanent magnet alternator as the most desirable source of energization for the electromagnetic governor in Figure 14. This has as one particular benefit: the advantage that voltage loss at low speed operation is no greater than the loss in engine speed. Other types of A. C. or D. C. generators may, however, be used, and the electromagnetic governor element 260 may obviously be modified accordingly, so long as the arrangement is such as to prevent the engine speed from falling below the desired minimum.

It may be noted that the boat engine application is in many respects comparable with the generator set application. The manually operable "idling" lever 220 of Figure 14 applies the same primary fuel limiting or idling-speed-enforcing effect as the automatic load-responsive idling devices for the generating sets. Throttle lever 250 merely replaces the automatic speed governor for the function of determining fuel supply for high speed operation. The electromagnetic low speed governing or regulating function is the same for boat engines as for generating sets, except that in generating sets the minimum idling voltage is protected as well as the minimum engine speed. In particular, the connection of the electromagnetic governor to the throttle in Figure 14 is shown as a direct one-way-yielding connection, so as to actually enforce the necessary minimum degree of throttle opening, whereas in Figures 1 to 11 the electromagnetic governor was connected to the idling device, so as to variably or partially overcome the influence of the idling device and thus permit the necessary advance of the throttle to sustain idling speed. It is unimportant whether the electromagnetic low speed regulator unit acts directly on the throttle or on the idling device.

It is possible, especially for engine applications other than that of driving generators as the principal load, to utilize other types of governors (than electromagnetic governors) for the specific function of protecting and controlling low speed operation. A small electromagnetic unit has been found most suitable for operating the throttle over the required small range of movement, and can conveniently be mounted at whatever location it is needed, whereas, for instance, it may be difficult to install and connect a special centrifugal governor which will be sensitive at low engine speeds.

Figure 14A is a partial view of an engine and throttle control structure, the omitted details for which may be the same as are described for Figure 14. Figure 14A shows the condition where there is no idling device of any kind, and manually operated throttle lever 250 is the main control. It is well known that a lever such as 250 may be operated by controls remote from the engine, if desired. A rigid link 240' is connected with throttle arm 24 at one end, and is slidably supported by a flange 254 at the upper end of throttle control lever 250. A bent-up end or stop of the link 240' enables throttle 22 to be opened to any extent desired by counter-clockwise operation of the lever 250, but lever 250 cannot directly effect any closure of the throttle. A spring 227 has one end attached to throttle arm 24 and the other end attached to a bracket 228, and will, when unopposed, close the throttle to the extent permitted by adjustment 25. An electromagnetic governor element 260, with its associated elements, is as described for Figure 14, and lower end 275 of the lever 270 may bear on the leftward end of the loop 243 which will enforce increase in fuel intake as necessary to maintain the idling speed to which the electromagnetic governor has been designed and adjusted.

Positions shown in Figure 14A are those of slow speed operation under the control of the electromagnetic governor. The throttle is open very slightly, and throttle arm 24 is slightly separated from adjustable stop 25. To shift the operation from the idling or trolling speed to normal power range of speed, the engine operator merely moves throttle control lever 250 counter-clockwise, say to the dotted line position, which advances the throttle, and the electromagnetic governor then is of no further effect. The engine is shifted back to the controlled low speed operation by merely moving lever 250 sufficiently in clockwise direction that it does not prevent sufficient closure of the throttle for the suitable idling speed and, when sufficient deceleration occurs, the effect of spring 277 is to assure that plunger 266 is moved away from engagement with core 267, whereafter the governor is biased only by its normal biasing spring 273, and will act in a manner to enforce the minimum idling speed.

It will be seen that Figure 14A illustrates the invention in one simple aspect. The specific structure comprises an engine, a load which normally requires a relatively high engine speed, a fuel intake throttle, a manually-positioned throttle lever for advancing the throttle for high speed operation (but so connected that the throttle may be advanced independently of the position of the lever), a throttle closing spring tending to close the throttle when unopposed, a permanent magnet generator driven by the engine, an electromagnetic idling speed governor energized by the permanent magnet generator having connection with the throttle to assure throttle advance as necessary for maintaining minimum idling speed and yet permitting independent advance of the throttle by the throttle lever.

Figure 15 illustrates that provision for closure of the fuel throttle independently of the governor, as heretofore depicted, is not a necessity to the practice of this invention. It illustrates also, in the case of the generating set application, that the change of engine speed is not limited strictly to the condition of complete absence or presence of load, but may be based upon the size of the load being carried. In addition, Figure 15 illustrates the use of an additional load circuit which is isolated from the speed selection apparatus. Load generator 3 may be A. C. or D. C., and is shown as excited by D. C. armature 4. Switch 7 or switch 7′ will close load circuit 6. Load 8′ is to be indicative of appliances which in total require wattage representing only a fraction of plant capacity. An additional load circuit, 306, is shown, this circuit passing through relay contacts 383 and 383′, switch 7″, load 8″ and through a ground return to generator 3. Manual switch 309 can be closed to by-pass the relay contacts.

High speed (load condition) governor arm 11 is connected with throttle arm 24 by a conventional link 345, so that both elements must move in unison. An electromagnet 330 comprises brackets 331 and 331′, winding 334, plunger 336, and fixed core 337. Plunger 336 is connected to lever 340, which has flange 342, spring 343, and is similar in plan to lever 40 of previous figures. Rigid link 346 is swively attached to arm 11, its free end riding in flange 342, so that the flange may press ball 347, and thus the force of spring 343, when unopposed, will wholly or partially overcome the force of loading spring 12, according to the selected strength of spring 343. If spring 343 is of less effect than spring 12, governor 10 is merely counter-biased, so that it will tend to govern at a lower speed. Spring 343 will be of at least sufficient strength to tend to counter-bias governor 10, so that it would tend to govern at a still lower speed than is desired for the idling operation. Generally speaking, this will leave governor 10 so lightly loaded that its action would be too erratic for any useful purpose, which condition is corrected by the low-speed governing unit. When winding 334 is sufficiently energized lever 340 is drawn leftwardly to restore the normal adjustment and the effect of high speed governor 10.

The low-speed governing system includes electromagnet 350, having end brackets 351 and 351′, winding 354, and plunger 367. The system includes lever 369 pivoted at 361, and loading spring 363 with end 363′ anchored and end 363″ urging the lever clockwise against the pull of plunger 356. Link 365 with upturned end 366 rides slidably through flange 342 and is swively attached to the lower end of lever 369. Therefore, when plunger 356 is disposed outwardly to its limit as determined by pin 344, throttle 22 will necessarily be part-way open and adequate for the engine to draw a powerful charge under low speed (idling) condition. Winding 354 is energized for governing action by shunt connection with a generator, and by taking the connection from load generator 3 the voltage regulation during the low speed operation will be good. The circuit is from load circuit 6, through wire 358, relay contacts 373 and 373′ when closed, thence wire 359, through rheostat 353, winding 354 and through ground to generator 3. If contacts 373 and 373′ are open, an energization is still provided, as resistance 355 is connected across the contacts, but in a manner that is independent of the particular adjustment of rheostat 353.

A current relay 370 has its operating winding 374 in series with load circuit 6, and preferably may be sufficiently slow acting to avoid response to brief surge currents. Also, the relay should operate on a rather close differential, and the sensitivity is adjustable by means of adjustable resistance 376, connected across winding 374. Relay 370 has one normally closed pair of contacts 373 and 373′ and one normally open pair 375 and 375′. As an instance of the operation, the relay may not pull in until amperage flow in load circuit 6 is, say 20% of plant capacity, and will drop out again when flow is lessened to, say 16% of plant capacity. A voltage relay 380 has an operating coil 384 and normally closed contacts 383 and 383′ which interrupt load circuit 306 when winding 384 is energized, provided switch 309 is open. Windings 384 and 334 are energized when contacts 375 and 375′ are held closed, the circuit from ground being through contacts 375 and 375′, winding 384, winding 334, thence through a battery 390 and returning to ground. The low speed operation will remain in effect until connected load is sufficient to cause amperage flow at or above 20% of plant capacity.

At positions illustrated, switch 7′ is closed, but appliances 8′ are drawing, say 8% of plant capacity amperage, and relay 370 remains in dropped-out status, and spring 343 is imposing its speed-lowering effect. Load appliances 8′ are being served with low voltage which can be varied by operation of rheostat 353 to alter the standard of governing. Since relay winding 384 is not energized, contacts 383 and 383′ are closed and load 8″ is being served the same voltage as load 8′. Since load 8″ is on an independent circuit, the current source for load 8″ is not necessarily confined to generator 3, and the choice will be on the type of current needed, and there still may be additional independent circuits. Thus load 8″ may be a few lamps which must be lighted continuously but permissible at low brilliance, but if load 8″ is not permissibly subjected to the voltage of high speed operation, switch 309 is left open, which will afford a complete interruption when contacts 383 and 383′ open. An instance of the usefulness of load 8″ is that it may be a battery charging load, even though only the load of charging the cranking and ignition battery, in which case rheostat 353 is adjusted so that the idling-generated voltage is just proper to keep the battery at full charge, and relay 380 will interrupt the charging upon shift to high speed.

Under the condition of low speed operation as depicted, the effective governed speed is influenced by several forces. The centrifugal mechanism of governor 10 exerts a moderate throttle closing force during low-speed operation. Springs 12 and 363 exert forces toward opening the throttle, while spring 343 exerts a force toward closing the throttle. In effect, these composite forces provide a bias for the pull exerted on plunger 356 by winding 354. The governing is therefore a certain combination of centrifugal and electromagnetic influences, and the electromagnetic influence will be at least sufficient so that the governing will be stable and responsive. Thus the force of spring 343 is sufficient that it is always tending to close throttle 22 to a further extent, were it not for the tendency of the low-speed system continuously to limit throttle closure. It will, however, be seen that, in a sense, the inclusion in the structure of electromagnet 350 with its components is optional, as, in theory, the system represents a complete and automatic dual speed governing system without benefit of the electromagnetic governor, merely provided that the force exerted by spring 343 be adjusted by means of holes 344, so that only a moderate counter-biasing effect is applied to governor 10. However, if a truly slow idling speed is required, electromagnetic governor 350 becomes a necessity and should provide the major influence of governing, and especially is this true where the requirement is for good regulation of voltage, which is especially needed for serving a low speed load, since the generator field is weak and inherent regulation is poor.

The voltage generated by low speed (idling condition) operation may be selected by adjustment of rheostat 353 and, if there is to be no load during the idling period, the voltage generated may be just above the point at which the generator fields tend to collapse, while at the other extreme, the voltage generated may be sufficient, for instance, to operate lamps at reasonable brilliance, which still may result in an operating speed much less than the high speed operation, particularly since, in typical small plants, the voltage produced under light load by high speed operation is excessive. Thus, load 8' may be only a few lamps which must be lit all night at modest brilliance. Rheostat 353 may be adjusted so that generated voltage is about one-half the rated voltage of the lamps, and the operation will be at a speed about one-half of the normal high (load) speed. The lamps will characteristically, however, draw more than half of their normal amperage, and rheostat 376 is adjusted so that relay 370 does not respond to the current drawn by the all-night lamps. If additional demand occurs, as by closing switch 7 (and this may be an A. C. appliance requiring normal frequency), the increased current flow will pull in relay 370, closing contacts 375 and 375'. In turn, relay 380 will pull in to interrupt load circuit 306. Plunger 336 will be drawn inwardly immediately to move and hold lever 340 sufficiently leftward that the normal force and effect of high speed governor 10 is unobstructed. Battery current is shown for energizing winding 334. Relatively little force is required for initially moving lever 340 leftwardly, because until acceleration is in effect, the centrifugal mechanism of governor 10 is weak, so that loading spring 12 cooperates in restoring the leftward position of lever 340. As acceleration takes effect, electromagnet 330 must hold lever 340 against the full force of spring 343 which may be a fairly strong spring in the particular system of Figure 15, but, at this stage, plunger 336 is in at least close proximity with core 337, and lever 340 is held locked for the duration of the high speed period.

When relay 370 was pulled in, contacts 373 and 373' were opened, but, by means of resistance 355, an energization of winding 354 was continued. As one advantage, this maintains uniform operating temperature of winding 354 through the different speed periods. All appliances connected in any load circuit now are served with the voltage generated by the high speed operation. When switch 7 is opened to remove load 8 from circuit, the plant is momentarily operating at full speed, so that the lamps representing load 8' are drawing their rated amperage, but a sufficient working margin is provided through adjustment of rheostat 376, so that the current drawn by the lamps is insufficient to hold relay 370 pulled in, and so relay 370 now will drop out to effect a reversal of the speed-changing cycle, and the lamps representing load 8' are operated again at low brilliance, and load 8" again will be served.

Figure 16 illustrates the idling condition speed governor as being of centrifugal type, as may be necessary if there is not available a source of generated current suitable to energize an electromagnetic governor in a manner to hold engine speed within the desired close limits. It is obvious that, as an additional governor, the electromagnetic governor is more flexible in that its location on the engine may be selected according to convenience in making operative connection with the fuel system whereas the centrifugal governor must be positioned where it can be driven. Figure 16 serves to make clear the arrangement whereby the load and idling condition governors operate to a large extent over different respective ranges of possible throttle motion. Others in the art have made a practice, in such cases where it is desired that engine speed always be under governed control and yet a slower or idling speed is required at times, of providing that the speed shifting apparatus (whatever its nature: manual or automatic) accomplishes the adjustment of speed by lowering the spring bias of the engine governor. The governor as so adjusted loses its normal ability for quick reversal of action to execute desirably short motions for governing control. Yet it is expected to govern under a condition where much smaller throttle motions are required for governing. In effect, the fuel intake system, as designed for higher speed operation, is now too large, while the lightly loaded governor has in effect become too weak for proper control of a governing function.

For maximum efficiency, the high speed (load condition) governor is so designed that its most effective fly-ball motion is spread over the range of throttle motion which is useful from the least-loaded to the most-loaded condition and the speed of the governor drive is sufficient for adequate spring loading. For low speed (idle condition) governing, which may be purely an idling condition or load condition within the limits of the speed, the efficient arrangement is that the useful fly-ball motion is utilized within a range from practically closed throttle to such wider position as is useful, and not beyond the point where still wider throttle opening is relatively of no effect, which, in case of low speed operation, generally is still a relatively closed throttle. The principle is independent of the basis of governing, whether electrical or centrifugal. The present practice of speed adjustment by change of bias has necessitated high idling speed and loss of ability to enable the utilization of loads at the idling speed.

The idling condition system of Figure 16 is the same as the simple system of Figure 1, comprising electromagnet 30, and lever 40 and their associated elements. The high-speed load condition circuit is made usable by closing switch blade 407 with contact 407'. When the switch blade 407' is closed with contact 407" the positions necessarily will remain as of idling condition speed operation, as illustrated, but the auxiliary or low-speed load circuit 406 will serve load 8" when switch 7" is closed, and any appliances 8" will have to be of the low voltage type, or alternately, the voltage for circuit 406 will have to be stepped up. Circuit 406 will be omitted entirely if the application does not require it.

The low-speed governor comprises centrifugal governor 410, mounted on the engine by bracket 409, and operating in the well-known manner. If rotational speed of shaft 413 falls below the normal average, loading spring 412 will force fly-balls 416 closer to shaft 413, moving the governor arm 411 toward the dotted line position, while a small excess of speed will displace the balls outwardly from shaft 413 and move arm 411 upward to or beyond the full-line position. Openings 415 in arm 411 permit selection of the effective governing speed. On shaft 413 is affixed a pulley 414, while crankshaft 9 carries a larger pulley 417 and belt 418 serving to drive shaft 413 at a sufficient speed during the idling condition. It is shown that electromagnetic governors may be protected from the effect of high speed operation by less expensive expedients.

A bracket 426 is affixed to intake 20 and carries lever 425 pivoted on pin 427. Lever 425 has an edge contour serving as a cam exerting a thrust against flange 24′ or throttle arm 24 to progressively open throttle 22 as arm 425 is swung clockwise. Rigid wire link 428 connects arm 426 with governor arm 411. Thus, governor 410 has a typical one-way-yielding or lost-motion connection with throttle 22, enabling the governor to variably limit the closure of the throttle, while permitting independent unrestricted opening of the throttle by the high speed governing system when lever 40 is swung leftwardly by action of electromagnet 30. It is clearly apparent that the edge contour of lever 425 is such that the maximum swing of throttle 22 is small, say in a range of 15° or 20°, whereas the range of possible motion with respect to high speed governing is much wider, and very possibly the maximum opening afforded by low speed governor action may be a smaller opening than necessary for operating at minimum load during the period of high speed operation, the possibility being due especially to the fuel requirement for overcoming engine friction at high speed operation.

It will be apparent that when any low-speed governor is connected to act directly on the throttle, as in Figure 16, that either the governor must remain energized during the period of high speed operation, or the maximum degree of throttle opening, as enforced by the de-energized governor, must not be so great as to obstruct regulation of the high speed. Thus, the range of throttle motion with respect to the idling condition operation should not overlap into the needed range of throttle motion with respect to the high speed load condition operation. This possibility was avoided in the previous figures by avoiding direct connection with the throttle, so that regardless of any overlapping of range between the two governors, there could be no obstruction of the effect of high speed governor 10, even in case of electrical failure.

I claim:

1. In a system for controlling the engine speed of an internal combustion engine-generator set including a generator serving at least one connectable-disconnectable load in a load circuit, said engine having a regulatable fuel intake system, and a load speed engine governor system, responsive, when it becomes effective, to regulate the fuel intake system for maintaining a uniform engine speed under load conditions, and an electromagnetically controlled off-on automatic idling system for the engine, constructed and arranged to act on the intake system, when effective at termination of load circuit current flow, to at least partially cut off the fuel supply and also render ineffective the load speed governor, the improvement comprising a low speed governing means constructed and arranged to act upon the fuel intake system by response at least to a predetermined low engine speed value to oppose the action of the idling system and increase the fuel intake, thus preventing the idling speed from falling below said predetermined value.

2. A system for controlling the engine speed of an internal combustion engine-generator set according to claim 1 in which the improvement comprises a low speed governing means so constructed and mechanically connected to the fuel intake system as to act upon said fuel intake system and initiate at least temporary increases in fuel intake thereby preventing loss of idling speed below said predetermined value when said idling system is in effect.

3. A system for controlling the engine speed of an internal combustion engine-generator set according to claim 2 in which the engine drives a generator supplying shunt current to the hereafter-named electromagnetic governor, and in which the generated voltage of said latter generator is at least roughly proportional to engine speed, and in which said low speed governing means is an electromagnetic governor responsive to variations in generated voltage for regulating said fuel intake system by at least initiating temporary increases in fuel intake, thereby preventing loss of idling speed below said pretermined value when said idling system is in effect.

4. A system for controlling the engine speed of an internal combustion engine-generator set according to claim 3 in which said electromagnetic governor is a plunger electromagnet governor constructed and arranged, when it becomes effective, to regulate continuously said fuel intake systems, thus maintaining a constant uniform idling speed.

5. In a system for controlling the engine speed of an internal combustion engine-generator set, according to claim 4 in which one generator driven by the engine is an A. C. generator supplying voltage at least roughly proportional to engine speed, in which the plunger electromagnet governor has an operating winding designed for energization by said A. C. generator, and in which the magnetic circuit of said plunger electromagnet governor is closable when said plunger assumes a fully inward position, said plunger having spring biasing means constructed and arranged normally to prevent said plunger from holding the fully inward position after the idling system has become effective upon termination of load circuit current flow, so that the plunger then is held extended within its governing range of motion, and in which said A. C. generator supplies shunt current to the operating winding of said plunger electromagnet governor, said spring biasing means being designed to permit fully inward motion of said plunger for closing the magnetic circuit of said electromagnet governor only upon increase of engine speed at initiation of load circuit current flow, whereby said magnetic circuit remains closed during load speed operation, and whereby current flow through said operating winding is limited by the effect of the closed magnetic circuit so that overheating of said winding is prevented.

6. In a system for controlling the engine speed of an internal combustion engine-generator set including a generator serving at least one connectable-disconnectable load in a load circuit, said engine having a regulatable fuel intake system and a load speed engine governor system, responsive, when it becomes effective, to regulate the fuel intake system for maintaining a uniform engine speed under load conditions, and an electromagnetically controlled off-on automatic idling system for the engine, constructed and arranged to act on the intake system, when effective at termination of load circuit current flow, to at least partially cut off the fuel supply and also render ineffective the load speed governor, said idling system comprising idling-enforcing spring means constructed and arranged to render said governor ineffective whereby idling speed is put in effect, said idling system also including electromagnetically actuated means constructed and arranged to respond to initiation of current flow in the load circuit and connected with said spring means in a manner to overcome said spring means only for the duration of load circuit current flow whereby said load speed governor system then becomes effective to regulate fuel intake for maintaining uniform load speed, the improvement comprising an idling governor for the engine, said idling governor being connected to the fuel intake system so as to oppose the effect of said spring means and thereby regulate the idling speed and to act upon the fuel intake system so as to respond at least to a predetermined low engine speed to oppose the action of the idling system whereby an increase in fuel intake is effected, thereby preventing the idling speed from falling below said predetermined value.

7. A system for controlling the engine speed of an internal combustion engine-generator set according to claim 6 in which said engine drives one generator supplying voltage at least roughly proportional to engine speed, and in which the idling governor is an electromagnetic governor energized by shunt connection with said latter generator, and in which the idling system includes switching means constructed and arranged to become automatically operable to at least reduce the energization of said idling governor for the duration of load circuit current flow.

8. In a system for controlling the engine speed of an internal combustion engine-generator set including a generator serving at least one connectable-disconnectable load in a load circuit, said engine having a regulatable fuel intake system including a throttle valve for regulating the amount of fuel fed to said engine, and a centrifugally operated load speed engine governor system connected with said throttle valve and responsive, when it becomes effective, to regulate the fuel intake system for maintaining a uniform engine speed under load conditions, an electromagnetically controlled off-on automatic idling system for the engine, constructed and arranged to act on the intake system, when effective at termination of load circuit current flow, to at least partially close the throttle valve and also render ineffective the load speed governor, the improvement comprising a low speed engine governing means constructed and arranged to respond to variations in engine speed and accordingly variably limit the closure of the throttle valve to maintain a uniform slow idling speed.

9. In a system for controlling the engine speed of an internal combustion engine-generator set including a generator serving at least one connectable-disconnectable load in a load circuit, said engine having a regulatable fuel intake system including a single throttle valve for regulating the amount of fuel fed to said engine, resilient means designed to only lightly bias the throttle valve openwardly, a centrifugally operated load speed governor system for the engine having its own loading spring means and having unyielding connection with said throttle valve only to close said throttle, and being operable through said unyielding connection and with the cooperation of said resilient means to regulate the fuel intake for maintaining uniform load speed under variable load conditions by variably limiting the openwardly-biased position of said throttle valve, an electromagnetically controlled off-on automatic engine idling system constructed and arranged to act on the intake system, when effective at termination of load circuit current flow, to at least partially close said throttle valve and also render ineffective the load speed governor, the improvement comprising a low speed engine governing means constructed and arranged to respond to variations in engine speed and variably limit the closure of the throttle valve by said idling system for maintaining a uniform slow idling speed.

10. In a system for controlling the engine speed of an internal combustion engine-generator set including at least one generator, one of which is serving at least one connectable-disconnectable load in a load circuit, said engine having a regulatable fuel intake system including at least one throttle valve, and a load speed engine governor system, responsive, when it becomes effective, to regulate one throttle valve for maintaining a uniform engine speed under load conditions, an electromagnetically controlled off-on automatic engine idling system constructed and arranged to act on the intake system, when effective, at termination of load circuit current flow, to at least partially cut off the fuel supply and also render ineffective the load speed governor, comprising idling-enforcing spring means constructed and arranged to render ineffective said governor whereby the lowered idling speed is put in effect, said idling system also including electromagnetically actuated means constructed and arranged to respond to initiation of current flow in the load circuit and connected with said spring means in a manner to overcome said spring means only for the duration of load circuit current flow whereby said load speed governor system then is effective to accelerate the engine and thereafter maintain uniform load speed of the engine until termination of load circuit current flow, the improvement comprising an idling speed governing means including an electromagnetic switching relay having normally-closed contacts in series with a shunt energization circuit for said electromagnetically actuated means, said relay having an operating winding in shunt connection with a generator driven by the engine and designed and arranged so that said normally-closed contacts are closed only upon reaching a predetermined lower value of engine idling speed or voltage, and remain closed for a period until a predetermined higher value of idling speed or voltage is reached, as effected by engine acceleration, said shunt energization circuit being effective when said contacts are closed, to operatively energize said electromagnetically actuated means whereby said latter means is made operatively effective to at least partially overcome said idling-enforcing spring means, permitting recovery of engine idling speed or voltage to said higher value.

11. A system for controlling the engine speed of an internal combustion engine-generator set according to claim 10 in which the electromagnetically actuated means connected with said idling-enforcing spring means comprises an electromagnet having a high resistance winding connected in series with a driven generator and with the load circuit whereby said winding is series-energized to initially overcome said spring means at initiation of load circuit current flow, and in which said electromagnetically actuated means includes speed-responsive switching means constructed and arranged to remove said high resistance winding from series connection with said driven generator and the load circuit upon acceleration toward load speed, a low resistance winding associated with said electromagnet and connected in series with the load circuit, and constructed and arranged to furnish holding energization enabling said electromagnet to hold overcome said spring means until the termination of load circuit current flow, and in which said shunt circuit is effective, when said contacts are closed, to operatively energize said high resistance winding whereby said electromagnetically actuated means is made operatively effective to at least partially overcome said idling-enforcing spring means to permit recovery of engine idling speed or voltage to said higher value.

12. A system for controlling the speed of an internal combustion engine-generator set according to claim 11 in which the load generator is an A. C. generator and in which said electromagnetically actuated means includes a current transformer and a rectifier, and in which said low resistance winding is the primary winding of said current transformer in series with the load circuit, and in which the secondary winding feeds current through said rectifier to said electromagnet to provide the holding energization for said electromagnet until termination of load circuit current flow.

References Cited in the file of this patent

UNITED STATES PATENTS

| | | |
|---|---|---|
| 2,396,176 | Hobart | Mar. 5, 1946 |
| 2,488,171 | Campbell | Nov. 15, 1949 |